(12) United States Patent
Akiyama et al.

(10) Patent No.: US 7,212,570 B2
(45) Date of Patent: May 1, 2007

(54) VIDEO CONVERTER AND COMPUTER PROGRAM FOR EXECUTING SAID VIDEO CONVERTER

(75) Inventors: Yasuhiro Akiyama, Ome (JP); Junichi Kimura, Koganei (JP); Muneaki Yamaguchi, Inagi (JP)

(73) Assignee: Hitachi, Ltd., Tokyo (JP)

( * ) Notice: Subject to any disclaimer, the term of this patent is extended or adjusted under 35 U.S.C. 154(b) by 897 days.

(21) Appl. No.: 10/366,480

(22) Filed: Feb. 14, 2003

(65) Prior Publication Data

US 2004/0076232 A1    Apr. 22, 2004

(30) Foreign Application Priority Data

Oct. 21, 2002    (JP)    ............................. 2002-305289

(51) Int. Cl.
*H04B 1/66*    (2006.01)

(52) U.S. Cl. ........................... 375/240.01; 375/240.25; 375/240.26; 375/240.12; 375/240.13; 375/240.15; 375/240.14; 382/233; 382/235; 382/238; 382/236

(58) Field of Classification Search ........... 375/240.01, 375/240.25, 240.26, 240.13, 240.12, 240.15, 375/240.14; 382/233, 235, 238, 236
See application file for complete search history.

(56) References Cited

U.S. PATENT DOCUMENTS 6,310,915 B1 *    10/2001    Wells et al. ........... 375/240.03
6,912,253 B1 *    6/2005    Li et al. ................ 375/240.12

FOREIGN PATENT DOCUMENTS

| JP | 2002-10267 | 1/2002 |
| JP | 2002-44669 | 2/2002 |
| JP | 2002-232860 | 8/2002 |

* cited by examiner

*Primary Examiner*—Shawn S. An
(74) *Attorney, Agent, or Firm*—Mattingly, Stanger, Malur & Brundidge, P.C.

(57) ABSTRACT

A video converter for converting a coding format of a great deal of video contents has three kinds of conversion modes including a conversion mode for performing conversion in two steps in accordance with the kinds of input pictures so that a converting operation can be completed within a limit time set in advance.

13 Claims, 16 Drawing Sheets

FIG. 2A

| MODE | PROCESS | CONVERSION TARGET PICTURES |
|---|---|---|
| 200 — MODE 1 | SINGLE-PASS CONVERSION | I,P PICTURES |
| 201 — MODE 2 | DUAL-PASS CONVERSION | I,P PICTURES + B PICTURES |
| 202 — MODE 3 | FULL CONVERSION | I,P,B PICTURES |

FIG. 2B

| MODE | PROCESS | PRIORITY | B PICTURE CONVERSION AT THE SECOND PASS — 203 |
|---|---|---|---|
| 200 — MODE 1 | SINGLE-PASS CONVERSION | 0 (FIXED) | NO CONVERSION |
| 201 — MODE 2 | DUAL-PASS CONVERSION | 0 TO 9 | PRIORITY 9: CONVERSION OF ALL B PICTURES ↕ PRIORITY 0: NO CONVERSION OF B PICTURE |
| 202 — MODE 3 | FULL CONVERSION | 10 (FIXED) | FULL CONVERSION AT THE FIRST PASS |

FIG. 3A

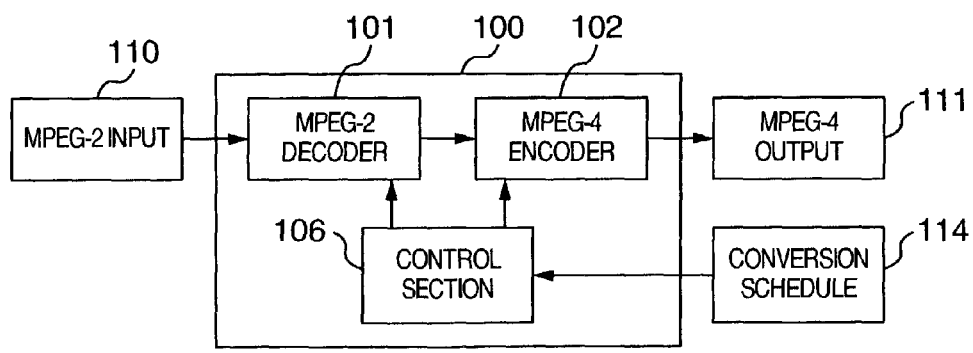

FIG. 3B

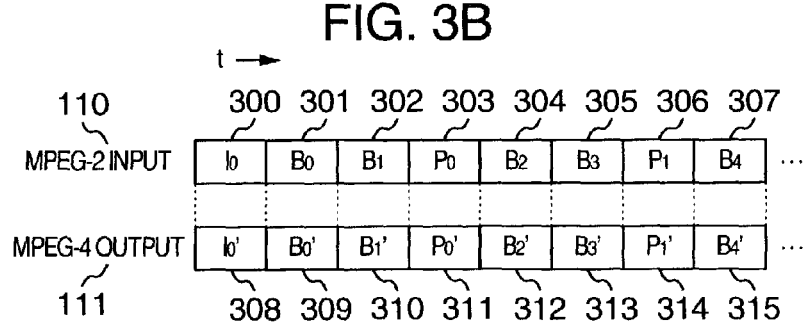

FIG. 10

CONVERSION LIST

113

| | | | |
|---|---|---|---|
| 1000 | BASIC INFORMATION | CONVERSION LIST MANAGEMENT ID | 1005 |
| | | NUMBER n OF FILES TO BE CONVERTED | 1006 |
| | | CONVERSION LIMIT TIME LTIME | 1007 |
| 1001 | INPUT FILE ADDRESS | FILE_ID1 \| MPEG-2 FILE 1 | 1008 |
| | | FILE_ID2 \| MPEG-2 FILE 2 | 1009 |
| | | ... \| ... | |
| | | FILE_IDn \| MPEG-2 FILE n | 1010 |
| 1002 | OUTPUT FILE ADDRESS | FILE_ID1 \| MPEG-4 FILE 1 | 1011 |
| | | FILE_ID2 \| MPEG-4 FILE 2 | 1012 |
| | | ... \| ... | |
| | | FILE_IDn \| MPEG-4 FILE n | 1013 |
| 1003 | CONVERSION MODE | FILE_ID1 \| MODE x | 1014 |
| | | FILE_ID2 \| MODE x | 1015 |
| | | ... \| ... | |
| | | FILE_IDn \| MODE x | 1016 |
| 1004 | PRIORITY | FILE_ID1 \| PRIORITY p | 1017 |
| | | FILE_ID2 \| PRIORITY p | 1018 |
| | | ... \| ... | 1019 |
| | | FILE_IDn \| PRIORITY p | 1020 |

FIG. 11

CONVERSION SCHEDULE 114

| | | | |
|---|---|---|---|
| 1100 — BASIC INFORMATION | CONVERSION SCHEDULE MANAGEMENT ID | | 1104 |
| | CONVERSION LIST MANAGEMENT ID | | 1105 |
| | NUMBER m OF CONVERSION STEPS | | 1106 |
| 1101 — CONVERSION SCHEDULE | STEP 1 | FILE_ID1 | 1107 |
| | STEP 2 | FILE_ID2 | 1108 |
| | ... | ... | |
| | STEP m | FILE_IDm | 1109 |
| 1102 — PASS CONTROL CODE | STEP 1 | PASS CONTROL CODE 1 | 1110 |
| | STEP 2 | PASS CONTROL CODE 2 | 1111 |
| | ... | ... | |
| | STEP m | PASS CONTROL CODE m | 1112 |
| 1103 — B PICTURE CONVERSION NUMBER IN SECOND-PASS | STEP m' | CONVERSION NUMBER m' | 1113 |
| | ... | ... | |
| | STEP m" | CONVERSION NUMBER m" | 1114 |

FIG. 12

PASS CONTROL CODE 1200

| PASS CONTROL CODE | PASS CONTROL CODE OPERATION |
|---|---|
| 1201 — FULL_CNV | FULL CONVERSION |
| 1202 — SINGLE_PASS | SINGLE-PASS CONVERSION |
| 1203 — DUAL_PASS1 | FIRST-PASS CONVERSION IN DUAL-PASS CONVERSION |
| 1204 — DUAL_PASS2 | SECOND-PASS CONVERSION IN DUAL-PASS CONVERSION |

FIG. 14

CONVERSION LIST 113-2

| | | CNV_LIST_001 | 1400 |
|---|---|---|---|
| 1000 | BASIC INFORMATION | 4 | 1401 |
| | | 600sec | 1402 |
| 1001 | INPUT FILE ADDRESS | FILE_ID1 / C:¥movie1.mp2 | 1403 |
| | | FILE_ID2 / C:¥movie2.mp2 | 1404 |
| | | FILE_ID3 / C:¥movie3.mp2 | 1405 |
| | | FILE_ID4 / C:¥movie4.mp2 | 1406 |
| 1002 | OUTPUT FILE ADDRESS | FILE_ID1 / C:¥movie1.mp4 | 1407 |
| | | FILE_ID2 / C:¥movie2.mp4 | 1408 |
| | | FILE_ID3 / C:¥movie3.mp4 | 1409 |
| | | FILE_ID4 / C:¥movie4.mp4 | 1410 |
| 1003 | CONVERSION MODE | FILE_ID1 / MODE2 | 1411 |
| | | FILE_ID2 / MODE2 | 1412 |
| | | FILE_ID3 / MODE3 | 1413 |
| | | FILE_ID4 / MODE1 | 1414 |
| 1004 | PRIORITY | FILE_ID1 / 2 | 1415 |
| | | FILE_ID2 / 8 | 1416 |
| | | FILE_ID3 / 10 | 1417 |
| | | FILE_ID4 / 0 | 1418 |

FIG. 15

CONVERSION SCHEDULE

| | | | |
|---|---|---|---|
| 1101 — BASIC INFORMATION | CNV_SCDL_001 | | 1500 |
| | CNV_LIST_001 | | 1501 |
| | | | 1502 |
| 1102 — CONVERSION SCHEDULE | STEP1 | FILE_ID3 | 1503 |
| | STEP2 | FILE_ID1 | 1504 |
| | STEP3 | FILE_ID2 | 1505 |
| | STEP4 | FILE_ID4 | 1506 |
| | STEP5 | FILE_ID1 | 1507 |
| | STEP6 | FILE_ID2 | 1508 |
| 1103 — PASS CONTROL CODE | STEP1 | FULL_CNV | 1509 |
| | STEP2 | DUAL_PASS1 | 1510 |
| | STEP3 | DUAL_PASS2 | 1511 |
| | STEP4 | SINGLE_PASS | 1512 |
| | STEP5 | DUAL_PASS2 | 1513 |
| | STEP6 | DUAL_PASS2 | 1514 |
| 1104 — B PICTURE CONVERSION NUMBER IN SECOND-PASS CONVERSION | STEP5 | 400 | 1515 |
| | STEP6 | 500 | 1516 |

114-2

VIDEO CONVERTER AND COMPUTER PROGRAM FOR EXECUTING SAID VIDEO CONVERTER

BACKGROUND OF THE INVENTION

1. Field of the Invention

The present invention relates to a video converter and a method for converting video data encoded by predetermined encoding means into data encoded by another different encoding means. Particularly, it relates to a video conversion system, a conversion method and a computer program for converting MPEG-2 video data into MPEG-4 video data. Incidentally, MPEG-2 and MPEG-4 are international standards for moving picture encoding.

2. Description of the Related Art

Video contents produced and broadcast by a TV broadcast station, a CATV (cable TV) station, a Web contents provider or the like are generally encoded in MPEG (Moving Picture Experts Group) or the like and stored in digital form in various kinds of recording media such as HDD (Hard Disk Drive) and DVD (Digital Versatile Disk) so that the video contents can be used secondarily. On this occasion, particularly MPEG-2 (Moving Picture Experts Group Phase 2) is used frequently because it is known that MPEG-2 can be used in DVD and HDTV (High Definition Television) and is high in picture quality after encoding.

At present, there is a discussion about a video delivery service for delivering video contents so that the video contents stored in the aforementioned manner can be played back by a PDA (Personal Digital Assistant), a PC (Personal Computer) or the like connected to a cellular phone or the Internet.

It is however substantially difficult to deliver the video contents in the form of MPEG-2 directly because the amount of information (from the order of hundreds of kbps to twenty and several Mbps) in MPEG-2 is larger by several times than the transmission capacity (from the order of tens of kbps to ten and several Mbps) in infrastructure of these circuits. Therefore, for example, a method of once converting MPEG-2 into MPEG-4 (Moving Picture Experts Group Phase 4) higher in information compression rate than MPEG-2 and storing the MPEG-4 again (or delivering the MPEG-4 immediately) may be conceived.

Incidentally, the number of video contents handled by a TV broadcast station, a CATV (cable TV) station, a Web contents provider or the like is enormous. When these video contents are to be processed by the video delivery system, "completion of conversion of a great deal of video contents within a limit time set in advance" is requested for the sake of convenience of a broadcast schedule. Particularly it is important to achieve the system support so that a predetermined conversion process can be executed to the last without failure even in the case where a request of conversion with a load too large (to complete conversion within the limit time) is set.

In the related art, there is a system of converting MPEG-2 video contents into MPEG-4 video contents (e.g., see JP-A-2002-10267 and JP-A-2002-44669).

JP-A-2002-10267 describes a method having a procedure for limiting conversion of MPEG-2 I pictures into MPEG-4 I pictures to restrain increase in the quantity of coding generated due to direct conversion of all MPEG-2 I pictures (larger in the quantity of coding than P pictures) into MPEG-4 I pictures. Even for conversion of I pictures, the method converts the I pictures into P pictures (smaller in the quantity of coding than I pictures) on the MPEG-4 conversion side in accordance with the necessity.

JP-A-2002-44669 describes a method making use of similar correlation between motion vector information in pictures before conversion and motion vector information in pictures after conversion, that is, for performing encoding by using MPEG-2 motion vector information for decoding as MPEG-4 motion vector information. In the method, an MPEG-4 motion vector retrieving process can be omitted so that conversion time can be shortened. On the other hand, there is a video delivery system in which video data converted into MPEG-4 is not stored in a recording medium but always directly sent out to a delivery line such as the Internet (e.g., see JP-A-2002-232860). No data are held on the system side after conversion.

The method disclosed in JP-A-2002-10267 is a method in which MPEG-2 I pictures are converted into MPEG-4 P pictures in accordance with the necessity to thereby limit the quantity of coding generated in MPEG-4 as a whole. Generally, because encoding of P pictures is a process of requiring reference to other pictures, it is assumed that the time required for conversion has a tendency to increase. Hence, there is a problem that the method cannot be adapted to a system aiming at completing conversion of a great deal of video contents within a predetermined limit time.

The method disclosed in JP-A-2002-44669 is a method for performing encoding by using MPEG-2 motion vector information for decoding as MPEG-4 motion vector information to thereby shorten the conversion time. In conversion attended with conditions such as image scaling, frame skipping, etc. in the conversion process, there is however possibility that MPEG-4 may be encoded with large error because the motion vector information used is not always equal to true motion vector information. Hence, there is a problem that picture quality of video after conversion in this case deteriorates compared with that of MPEG-4 video encoded on the basis of true motion vector information. The method disclosed in JP-A-2002-232860 has a system configuration in which video contents converted in MPEG-4 are not stored. Because the method is however developed on the assumption that all MPEG-2 input frames are processed, there is no particular consideration with respect to execution of conversion of a predetermined number of video contents within a limit time. Accordingly, there is a problem that the method, like the aforementioned related-art method, cannot be adapted to a system aiming at completing conversion of a great deal of video contents within a predetermined limit time.

SUMMARY OF THE INVENTION

The present invention is developed to solve the aforementioned problems and an object of the present invention is to provide means in a system having a function for converting a plurality of MPEG-2 video contents into MPEG-4 video contents, in which system the means can complete conversion of all the video contents while keeping video quality at a predetermined level even in the case where requested conversion is predicted to be not able to be completed within a limit time set in advance by an ordinary converting procedure (of converting all MPEG-2 pictures into MPEG-4 pictures).

Typical aspects of the invention disclosed in this specification will be described in brief as follows.

According to an aspect of the invention, there is provided a data conversion method including: the encoding step of acquiring a first encoded data constituted by various kinds of pictures, extracting/decoding a first kind of pictures from the various kinds of pictures, and converting the first kind of pictures into a second encoded data; the encoding step of decoding a second kind of pictures other than the first kind of pictures after the first-mentioned encoding step and converting the second kind of pictures into the second encoded data; and the step of inserting the second kind of encoded pictures into data of the first kind of encoded pictures to generate a data stream.

According to another aspect of the invention, there is provided a re-encoding method including the steps of: acquiring an encoded data constituted by various kinds of pictures encoded by a first encoding method; selecting one of re-encoding modes and the degree of priority in accordance with input conversion time; and re-encoding the encoded data by a second encoding method, wherein the re-encoding modes include: a first mode for extracting/ decoding a predetermined kind of pictures from the various kinds of pictures and applying the second encoding method to the predetermined kind of pictures; a second mode for applying the second encoding method to other pictures than the extracted predetermined kind of pictures after the predetermined kind of pictures are re-encoded; and a third mode for applying the second encoding method to the acquired encoded data in acquiring order.

BRIEF DESCRIPTION OF THE DRAWINGS

FIGS. 2A and 2B are diagrams showing conversion modes provided by the video converter;

FIGS. 3A and 3B are diagrams showing a full conversion operation;

FIG. 10 is a diagram showing the contents of a conversion list;

FIG. 11 is a diagram showing the contents of a conversion schedule;

FIG. 12 is a diagram showing the contents of a pass control code;

FIG. 14 is a diagram showing the contents of a conversion list as an example;

FIG. 15 is a diagram showing the contents of a conversion schedule as an example;

DESCRIPTION OF THE EMBODIMENTS

Figure 1:
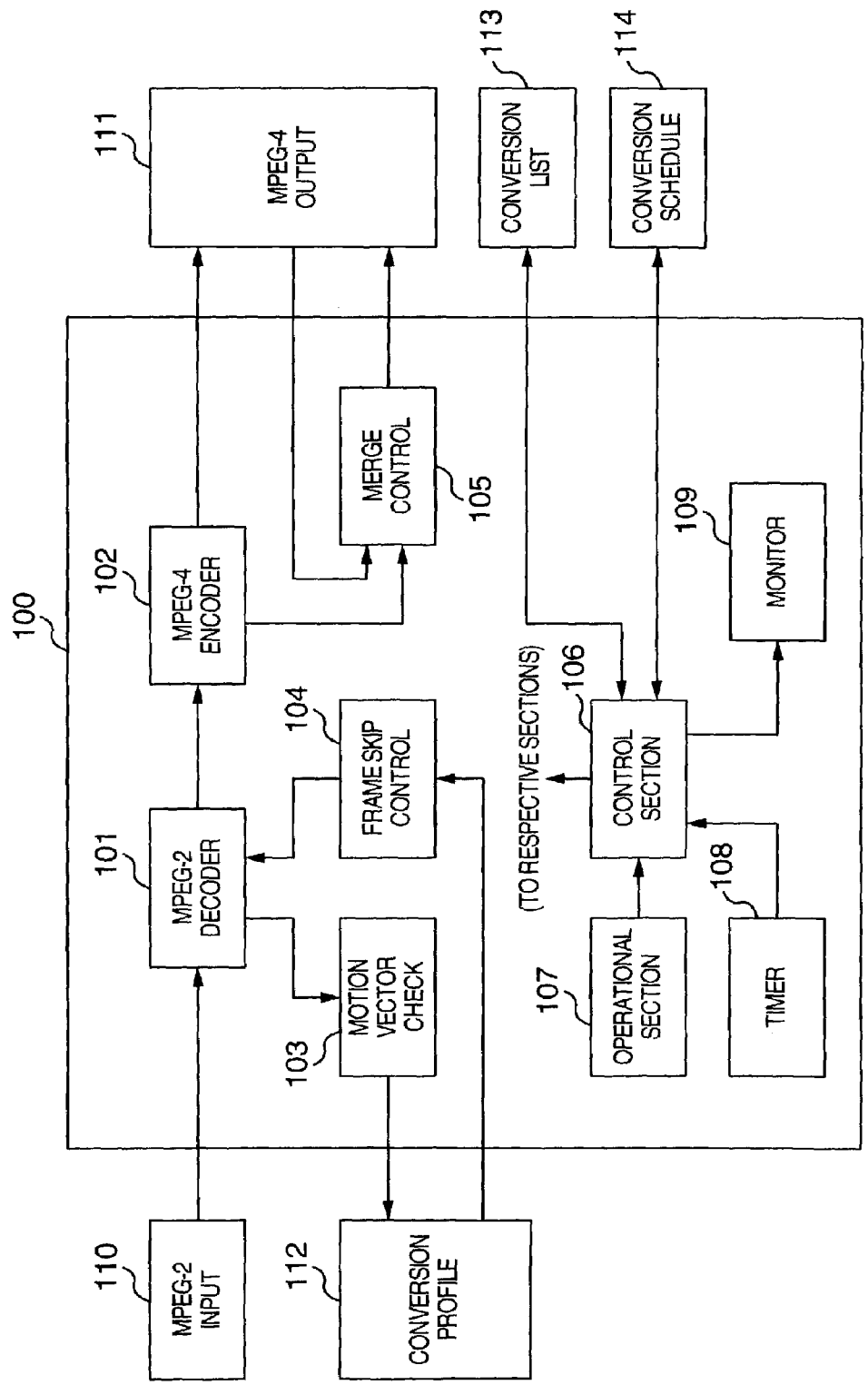
FIG. 1 is a diagram showing the configuration of a video converter.

A video delivery system and a video receiver according to an embodiment of the invention will be described below.

A video converter according to the invention has an MPEG-2 input section, an MPEG-2 decoder section, an MPEG-4 encoder section, a motion vector check section, a conversion profile, a frame skip section, a merge control section, an MPEG-4 output section, an operational section, a conversion list, a conversion schedule, a monitor, a timer, and a control section. The MPEG-2 input section is a recording medium for storing MPEG-2 video files. The MPEG-2 decoder section is provided for decoding MPEG-2 video to an original video signal. The MPEG-4 encoder section is provided for encoding the once decoded original video signal to MPEG-4 video. The motion vector check section is provided for extracting the bit-stream position of each picture decoded by the MPEG-2 decoder, the bit-stream position of each picture not decoded but skipped in a first conversion stage, the average motion vector value, and so on. The conversion profile is provided as a file in which these pieces of information are collectively stored. The frame skip section is provided for controlling movement to each picture portion not decoded but skipped in the first conversion stage on the basis of information of the conversion profile in a second conversion stage. The merge control section is provided for reading an MPEG-4 video file generated in the first conversion stage and merging the MPEG-4 video file with an MPEG-4 video file output from the MPEG-4 encoder section in the second conversion stage to thereby output the merged files as an MPEG-4 video file again. The MPEG-4 output section is a recording medium for storing the MPEG-4 video file output from the MPEG-4 encoder section or the merge control section. The operational section is provided so that the selection and priority of MPEG-2 video to be converted, and limit time for conversion are input by the user through the operational section. The conversion list is provided for storing the location of the input MPEG-2 video as a file. The conversion schedule is provided for storing a sequence of processing as a file in accordance with the conversion sequence and conversion method decided automatically on the basis of the conversion list. The monitor is provided for displaying the operating state of the video converter, the situation of progress of conversion, GUI (Graphical User Interface) at the time of user input, the video under conversion, etc. in accordance with the necessity. The timer is provided for measuring the time of conversion. The control section is connected to respective sections of the video converter for performing appropriate control.

The video converter has three conversion methods allocated on the basis of the priority of conversion set by the user in accordance with each video content. Then, the first and second conversion stages different in procedure are allocated on the basis of the conversion limit time set by the user so that the two conversion stages are performed in an appropriate sequence. In such a manner, the video converter performs a function for converting MPEG-2 video to MPEG-4 video.

FIG. 1 is a diagram showing the configuration of a video converter 100 according to the invention.

MPEG-2 video is converted into MPEG-4 video as follows. An MPEG-2 video file stored in a recording medium such as HDD is input (110) and decoded to a video signal prior to encoding by an MPEG-2 decoder 101. The signal is encoded again by an MPEG-4 encoder 102 and output (111) as an MPEG-4 video file to a recording medium. Three methods are used for the conversion. One is a full conversion method in which all pictures, that is, I pictures (intra-coded pictures), P pictures (forward predictive-coded pictures) and B pictures (bidirectionally predictive-coded pictures) in the input MPEG-2 video are converted. Another is a single-pass conversion method in which I pictures and P pictures are converted but conversion of B pictures is skipped. The last one is a dual-pass conversion method in which the skipped B pictures are converted into MPEG-4 video so that the MPEG-4 video is merged with MPEG-4 video which has been already obtained by conversion of I pictures and P pictures in the same MPEG-2 video and stored in the recording medium. A motion vector check section 103 operates both at the time of full conversion and at the time of single-pass conversion. When a picture is converted, the motion vector check section 103 outputs information such as the bit-stream position of the picture, the coding bit quantity of the picture, etc. When a picture is not converted, the motion vector check section 103 outputs information at least containing the input bit-stream position of the picture, the average vector value, the position of the picture referred to at the time of decoding the picture, the output bit-stream position of the picture on the assumption that conversion into MPEG-4 video is carried out, and a flag (MPEG-4 conversion flag) indicating whether the picture is converted into an MPEG-4 picture or not. The average vector value is used for deciding the picture to be converted preferentially in the second-pass conversion of the dual-pass conversion. The positional information of the picture is used for specifying the position of the picture to be converted and specifying the position for merging after conversion. The MPEG-4 conversion flag is used for the user's recognizing pictures not converted after the dual-pass conversion.

Information extracted by the motion vector check section 103 is stored as a conversion profile 112 on a recording medium. A frame skip control section 104 operates at the time of dual-pass conversion. The frame skip control section 104 reads the conversion profile 112 and controls the movement to the position of B picture skipped at the time of single-pass conversion. A merge control section 105 operates at the time of dual-pass conversion. The merge control section 105 merges B picture converted by dual-pass conversion with an MPEG-4 video bit stream output by single-pass conversion while referring to the conversion profile. A conversion list 113 is provided as a file in which information indicating the conversion limit time, the address (including the file name) of the MPEG-2 video file as a source of conversion, the address (including the file name) of the MPEG-4 video file as a destination of conversion and the method of conversion is recorded. The conversion list 113 is input by the user through the operational section 107. The video converter 100 automatically decides the conversion sequence and conversion method on the basis of the conversion list 113 and generates a conversion schedule 114. Conversion is executed sequentially in accordance with the procedure designated by the conversion schedule 114. GUI (Graphical User Interface) or the like at the time of user input is displayed on a monitor 109. The operating state of the video converter 100, the situation of progress of conversion, the video under conversion, etc. are also displayed on the monitor 109 as occasion demands. A timer 108 is used for measuring the conversion time to judge whether or not the conversion time has reached the limit time set in advance. A control section 106 is connected to respective sections of the video converter 100 for performing appropriate control.

FIGS. 2A and 2B are diagrams showing the kind of conversion executed by the video converter 100 according to the invention.

A predictive coding method called "bidirectional motion compensating inter-frame prediction" is used in video coding using MPEG-2 or MPEG-4 in order to reduce redundancy of video information in the direction of the time axis. Predictive coding is a method of coding by using difference between a signal value of a certain pixel in a picture and a signal value of the pixel in a picture different in time (i.e. the past or future picture). This method uses such property of continuous pictures that an objective picture have a close resemblance to pictures before and after the objective picture.

Three kinds of pictures, that is, I, P and B pictures are used in predictive coding. The I picture is a picture encoded from an input image itself and having no correlation with other pictures. The P picture is a picture generated by referring to image information of I pictures or other P pictures. The B picture is a picture generated by referring to image information of I or P pictures in the same manner as the P picture except that the B picture itself is not referred to by other pictures.

In video conversion, when conversion of an I or P picture as a certain input picture is to be skipped in order to shorten the time required for conversion, in practice, decoding must be always performed because the skipped I or P picture itself is referred to by other pictures. For this reason, it is substantially impossible to shorten the processing time compared with the case where the I or P picture is not skipped. When the I or P picture is skipped, it is impossible to decode other pictures by referring to the I or P picture after skipping. As a result, there is a disadvantage that continuity of video is spoiled at other pictures than the I or P picture to be skipped. On the other hand, when conversion of a B picture is to be skipped, continuity of video is not spoiled at other pictures than the B picture to be skipped because the B picture is not referred to by other pictures.

The video conversion method used in the invention is a method using the properties of the three kinds of pictures. Particularly, the method has means for performing conversion in two stages in order to shorten the processing time of conversion. The two conversion stages are executed in the following procedure. First, MPEG-2 video input pictures are converted into MPEG-4 video while B picture portions of the MPEG-2 video input pictures are skipped (first conversion stage). Then, if there is enough time, the skipped B picture portions are converted into MPEG-4 video (second conversion stage) so that the MPEG-4 video generated in the second conversion stage is merged with the MPEG-4 video generated in the first conversion stage.

FIG. 2A is a diagram showing conversion target pictures in accordance with conversion modes.

There are three conversion modes, that is, a single-pass conversion mode 200, a dual-pass conversion mode 201 and a full conversion mode 202. In the single-pass conversion mode 200, MPEG-2 video pictures except B pictures, that is, only I and P pictures are converted into MPEG-4 video. In the dual-pass conversion mode 201, first, I and P pictures are converted into an MPEG-4 video bit stream in the first conversion stage (hereinafter referred to as "first-pass conversion"). Then, if there is enough time to finish conversion within the conversion limit time set in advance, the B pictures skipped in the first-pass conversion are converted into MPEG-4 video in the second conversion stage (hereinafter referred to as "second-pass conversion") so that the MPEG-4 video generated in the second-pass conversion is merged with the MPEG-4 video bit stream generated in the first-pass conversion. In the full conversion mode 202, all I, P and B pictures are converted into MPEG-4 video in acquiring order. For example, in the video converter 100, the conversion mode is designated by using a code of mode 1 for single-pass conversion, a code of mode 2 for dual-pass conversion and a code of mode 3 for full conversion.

The single-pass conversion mode has an advantage that the conversion time can be shortened greatly because conversion is performed while conversion of B pictures is skipped. Strictly speaking, in the single-pass conversion mode, quality deteriorates in terms of smoothness of video because pictures that are supposed to be present originally are thinned out. It is however generally known that video constituted by pictures of the order of 10 frames per second is acceptable as a moving picture. Generally, in MPEG-2 video constituted by pictures of the order of 30 frames per second, the number of B pictures inserted is in a range of from the order of 10 frames per second to the order of 20 frames per second. Accordingly, even in the case where B pictures are thinned out, the number of pictures in a range of from the order of 10 frames per second to the order of 20 frames per second can be secured so that converted video with minimized quality deterioration can be output.

The dual-pass conversion mode is a mode for converting B pictures skipped in the single-pass conversion mode into MPEG-4 video and merging the MPEG-4 video with the MPEG-4 video once output in the single-pass conversion mode. The dual-pass conversion mode is performed when there is enough time to perform conversion within the conversion limit time. Because the B pictures once thinned out are filled back, the video quality approaching to video quality equivalent to that of the output video in the full conversion mode can be brought about.

In the full conversion mode, the conversion time cannot be shortened because all pictures are converted into MPEG-4 pictures in acquiring order. Quality deterioration of the video after conversion is however small because there is no picture skipped. Hence, the quality of the output video substantially approaches to that of the input video.

One of the conversion modes can be set by the user optionally. A standard setting method is provided so that mode 3 (full conversion mode 202) is selected in the case where the video quality is to be kept high even after conversion, and so that mode 1 (single-pass conversion mode 200) is selected in the case where video quality need not be considered particularly. In the case where priority is allowed to be lower than that in the full conversion mode 202 but conversion for keeping the video quality high is to be performed if there is enough time to perform conversion within the conversion limit time, mode 2 (dual-pass conversion mode 201) is selected.

FIG. 2B is a diagram for explaining the priority 203 designated by the user at the time of setting the conversion mode.

The priority 203 serves as an indicator by which the video converter 100 judges how many pictures among the B pictures skipped in the first-pass conversion are to be converted. Specifically, the priority 203 is used for deciding the number of B pictures to be converted into MPEG-4 pictures in the second-pass conversion of the dual-pass conversion mode 201.

Specifically, when a plurality of MPEG-2 video contents are to be subjected to dual-pass conversion, the number of B pictures to be converted into MPEG-4 pictures in the second-pass conversion in each MPEG-2 video content is decided on the basis of the priority designated by the user. The number of B pictures to be converted in one MPEG-2 video content is decided in accordance with the relation in priority to another MPEG-2 video content, so that the number of B pictures to be converted in the second-pass conversion is set to become larger as the priority becomes higher. When only one MPEG-2 video content is subjected to the dual-pass conversion, the priority of the MPEG-2 video content is automatically set to be the highest because the priority is substantially insignificant.

The priority 203 may be set optionally by the user through an interface or may be set automatically by the video converter 100. As an example of automatic setting, the priority 203 is decided on the basis of the order of MPEG-2 video contents designated for conversion by the user (or reverse order) so that the first MPEG-2 video content designated by the user has the highest priority and the last MPEG-2 video content designated by the user has the lowest priority. As another example, the priority is decided on the basis of the order of points of time of generation of MPEG-2 video contents (or reverse order) so that the latest MPEG-2 video content generated has the highest priority and the oldest MPEG-2 video content generated has the lowest priority. As a further example, the bit rate, frame rate, picture size, etc. of each MPEG-2 video content input may be used as an indicator for deciding the priority.

In the example shown in FIG. 2B, one of ten values in a range of from 0 to 9 is selected as the priority in the dual-pass conversion mode 201. The number of B pictures to be converted is set to become larger as the value of the priority becomes larger. The number of B pictures to be converted is set to become smaller as the value of the priority becomes smaller. The priority "9" is the highest priority. In the priority "9", all B pictures are converted. The priority "0" is the lowest priority. In the priority "0", conversion of B pictures is not executed. When the priority is set to be in a range of from 1 to 8, the number of B pictures to be converted is set in accordance with the ratio of the set value of the priority.

In the single-pass conversion mode 200, the priority is fixed to "0" because conversion of B pictures is not executed. In the full conversion mode 202, the priority is fixed to "10" which shows the case where all B pictures are converted in the first-pass conversion.

The positions of MPEG-2 video B pictures to be converted in the second-pass conversion are decided by referring to motion vector information of B pictures as to whether the positions are to be changed or not. Particularly a picture large in motion vector is preferentially allocated as a target of conversion. Generally, a picture having a large motion vector value is regarded as a portion large in motion on a display screen (i.e., a portion of rapid moving of a person, an object, a landscape or the like in the video), so that a smooth moving picture can be reproduced when a larger number of pictures are inserted. On the other hand, a picture having a small motion vector value is regarded as a portion small in motion on a display screen, so that deterioration of video is hardly perceived even in the case where pictures are more or less thinned out.

Although FIG. 2B shows the case where the number of set values of priority in the dual-pass conversion mode 201 are ten, this is only an example of the setting method. The number of set values of priority may be changed optionally in accordance with the system configuration.

FIGS. 3A and 3B are diagrams showing the operation of the video converter 100 in the full conversion mode 202.

FIG. 3A is a diagram showing operating blocks of the video converter 100 in the full conversion mode 202.

In the full conversion mode 202, an MPEG-2 video bit stream is input (110) into the video converter 100 from a recording medium on the basis of the conversion schedule 114 generated in advance in accordance with user's setting. All I, P and B pictures are decoded by the MPEG-2 decoder 101 successively. All the decoded pictures are encoded by the MPEG-4 encoder 102 successively, so that an MPEG-4 video bit stream is output (111) from the video converter 100 to the recording medium.

FIG. 3B is a diagram showing the relation between MPEG-2 video input pictures and MPEG-4 video output pictures in the full conversion mode 202.

An I0 picture (300), a B0 picture (301), a B1 picture (302) and a P0 picture (303) of the MPEG-2 video input (110) to the video converter 100 are successively converted into an I0' picture (308), a B0' picture (309), a B1' picture (310) and a P0' picture (311) of the MPEG-4 video output (111) respectively. Subsequently, a B2 picture (304), a B3 picture (305), a P1 picture (306) and a B4 picture (307) are successively converted into a B2' picture (312), a B3' picture (313), a P1' picture (314) and a B4' picture (315) respectively in the same manner as described above.

Figure 4A:
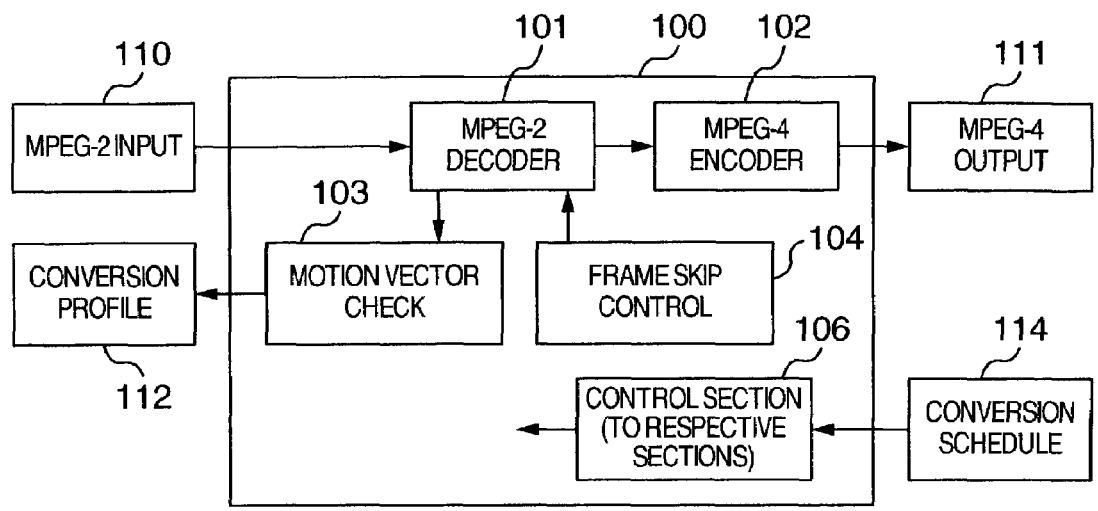
FIGS. 4A and 4B are diagrams showing a single-pass conversion operation or a conversion operation in first-pass conversion of a dual-pass conversion mode.
Figure 4B:
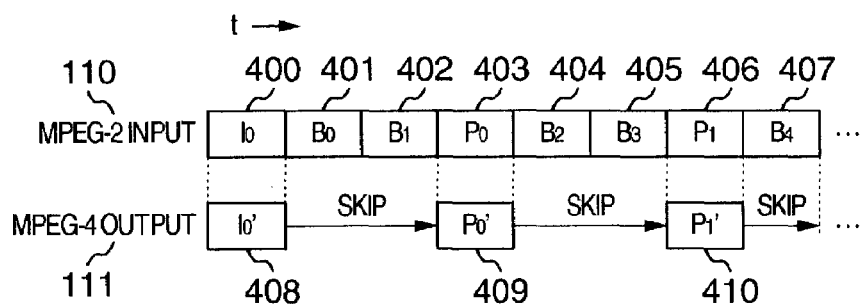

FIGS. 4A and 4B are diagrams showing the operation of the video converter 100 in the single-pass conversion mode 200 or in the first-pass conversion of the dual-pass conversion mode 201. The operation of the video converter 100 in the first-pass conversion of the dual-pass conversion mode 201 is the same as that in the single-pass conversion mode 200. The operation of the video converter 100 in the single-pass conversion mode 200 will be described as an example with reference to FIGS. 4A and 4B.

FIG. 4A is a diagram showing operating blocks of the video converter 100 in the single-pass conversion mode 200.

In the single-pass conversion mode 200, an MPEG-2 video bit stream is input (110) into the video converter 100 from a recording medium on the basis of the conversion schedule 114 generated in advance in accordance with user's setting. All pictures except B pictures, that is, I and P pictures are decoded by the MPEG-2 decoder 101 successively. The decoded I and P pictures are encoded by the MPEG-4 encoder 102 immediately, so that an MPEG-4 video bit stream is output (111) from the video converter 100 to the recording medium. On this occasion, the motion vector check portion 103 outputs predetermined information concerning conversion (which will be described later with reference to FIGS. 5 and 6), so that the information is stored as a conversion profile 112 in the recording medium.

FIG. 4B is a diagram showing the relation between MPEG-2 video input pictures and MPEG-4 video output pictures in the single-pass conversion mode 200.

When an I0 picture (400), a B0 picture (401), a B1 picture (402) and a P0 picture (403) as MPEG-2 video pictures are successively input into the video converter 100 as shown in FIG. 4B, the I0 picture (400) and the P0 picture (403) are converted while conversion of the B0 picture (401) and the B1 picture (402) located in between is skipped. With respect to a B2 picture (404), a B3 picture (405), a P1 picture (406) and a B4 picture (407) subsequently input into the video converter 100, only the P1 picture (406) is converted while conversion of the B2 picture (404), the B3 picture (405) and the B4 picture (407) is skipped. Accordingly, in this case, a bit stream constituted by an I0' picture (408), a P0' picture (409) and a P1' picture (410) connected in the cited order after conversion is output as MPEG-4 video pictures from the video converter 100.

Figure 5:
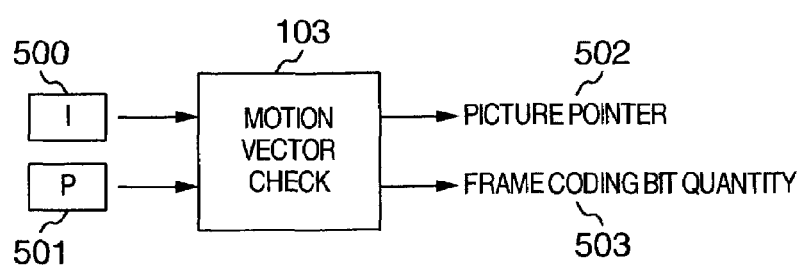
FIG. 5 is a diagram showing information output from the motion vector check section at the time of conversion of I picture or P picture.

FIG. 5 is a diagram showing information output from the motion vector check section 103 when an I or P picture is converted.

When an I picture 500 or a P picture 501 is converted, the input bit stream position (picture pointer 502) of the picture and the coding bit quantity 503 of the picture are output from the motion vector check section 103.

Figure 6:
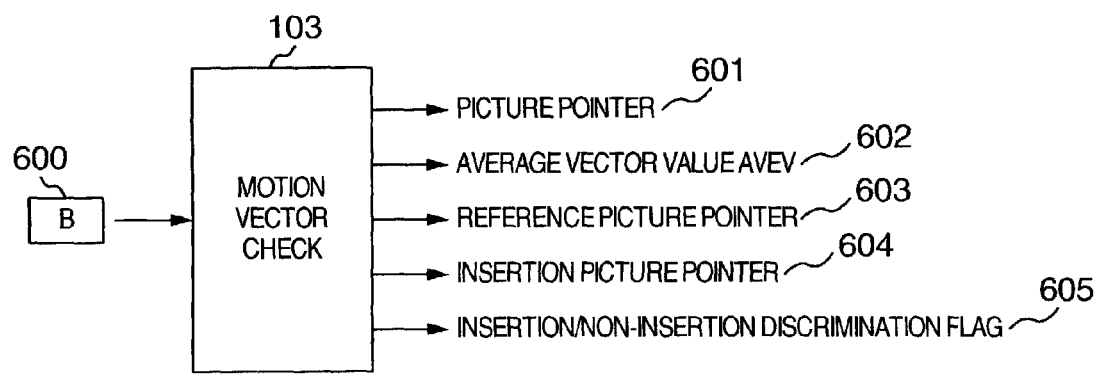
FIG. 6 is a diagram showing information output from the motion vector check section at the time of skipping of conversion of B picture.

FIG. 6 is a diagram showing information output from the motion vector check section 103 when conversion of a B picture is skipped.

When conversion of a B picture 600 is skipped, information at least containing the input bit stream position (picture pointer 601) of the picture, the average vector value AveV (602), the position of a reference picture for decoding the picture (reference picture pointer 603), the output bit stream position (insertion picture pointer 604) of the picture after conversion on the assumption that the B picture 600 is converted into MPEG-4 video, and the flag for indicating whether the picture is actually converted into an MPEG-4 picture or not (insertion/non-insertion discrimination flag 605) is output from the motion vector check section 103. Incidentally, when the video converter 100 is provided on the assumption that only single-pass conversion is executed, configuration may be made so that the information is not output from the motion vector check section 103. The average vector value AveV (602) is a value obtained by averaging the absolute values of a plurality of motion vectors contained in coding information of the B picture. The average vector value AveV (602) is used as a parameter for deciding the B picture to be converted preferentially in the second-pass conversion of the dual-pass conversion mode 201.

Figure 7A:
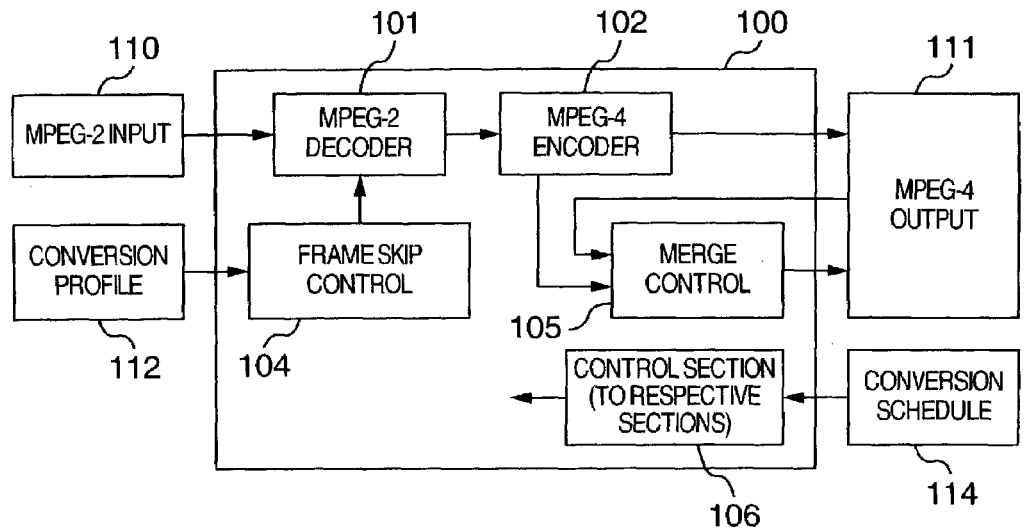
FIGS. 7A, 7B and 7C are diagrams showing a conversion operation in second-pass conversion of the dual-pass conversion mode.
Figure 7B:
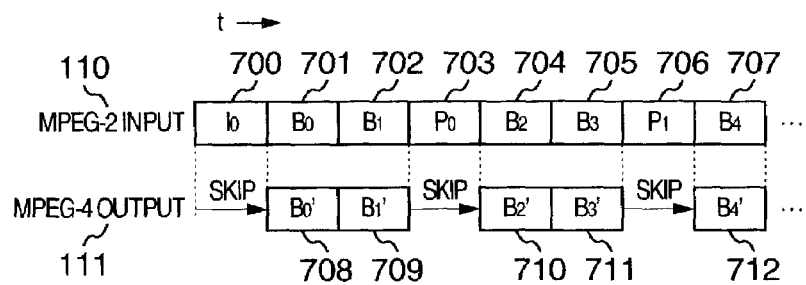
Figure 7C:
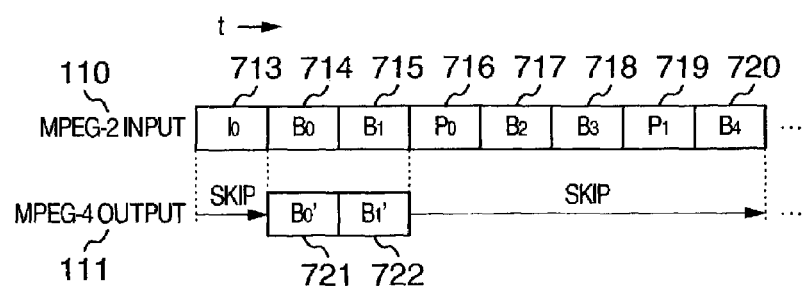

FIGS. 7A to 7C are diagrams showing the operation of the video converter 100 in the second-pass conversion of the dual-pass conversion mode 201.

FIG. 7A is a diagram showing operating blocks of the video converter 100 in the second-pass conversion of the dual-pass conversion mode 201.

B pictures skipped in the first-pass conversion are converted in the second-pass conversion of the dual-pass conversion mode 201. First, the same MPEG-2 video bit stream as used in the first-pass conversion is input (110) into the video converter 100 from the recording medium on the basis of the conversion schedule 114 generated in advance in accordance with user's setting. On this occasion, the frame skip control section 104 refers to the conversion profile 112 which has been already generated. Among the B pictures skipped in the first-pass conversion, pictures to be preferentially converted are decided on the basis of comparison in the magnitude of the average vector value AveV (602). As the average vector value AveV (602) becomes larger, the priority of conversion becomes higher. As another means for deciding B pictures, B pictures to be converted may be decided by referring to the frame coding bit quantity (503). It is generally known that a large coding quantity portion of a picture (frame) is large in picture motion like the case where the motion vector value is large. Accordingly, a method of referring to the frame coding bit quantity (503) can be used alternatively. Movement up to the position of the decided B picture on the bit stream is controlled by referring to the picture pointer (601). The B picture extracted here is encoded by the MPEG-4 encoder 102 immediately after decoded by the MPEG-2 decoder 101 while an I or P picture to be referred to at the time of decoding is specified on the basis of the reference picture pointer (603). Then, the encoded picture is merged with a predetermined position of the MPEG-4 video bit stream, which has been already output to the recording medium in the first-pass conversion, by the merge control section 105. Then, the resulting MPEG-4 video bit stream is output (111) from the video converter 100 to the recording medium again. The merge position of the B picture is decided by referring to the insertion picture pointer 604 of the conversion profile 112.

FIG. 7B is a diagram showing the relation between MPEG-2 video input pictures and MPEG-4 video output pictures in the second-pass conversion of the dual-pass conversion mode 201.

Only B pictures are converted in the second-pass conversion of the dual-pass conversion mode 201. Accordingly, when an I0 picture (700), a B0 picture (701), a B1 picture (702) and a P0 picture (703) as MPEG-2 video pictures are input in the cited order as shown in FIG. 7B, the B0 picture (701) and the B1 picture (702) are converted while conversion of the I0 picture (700) and the P0 picture (703) which have been already converted in the first-pass conversion is skipped.

With respect to a B2 picture (704), a B3 picture (705), a P1 picture (706) and a B4 picture (707) subsequently input, the B2 picture (704), the B3 picture (705) and the B4 picture (707) are converted while conversion of the P1 picture (706) is skipped.

The positions of the B0 picture (701), the B1 picture (702), the B2 picture (704), the B3 picture (705) and the B4 picture (707) are specified by referring to the picture pointer (601) of the conversion profile 112.

FIG. 7C is a diagram showing an example of the operation of the video converter 100 in the case where B pictures to be preferentially converted in the second-pass conversion of the dual-pass conversion mode 201 are decided.

If B pictures to be preferentially converted are decided to be a B0 picture (714) and a B1 picture (715) in the MPEG-2 video picture input shown in FIG. 7C, only the B pictures are converted so that a B0' picture (721) and a B1' picture (722) are output as an MPEG-4 video picture output in the second-pass conversion. The positions of the B0 picture (714) and the B1 picture (715) are specified by referring to the picture pointer (601) of the conversion profile 112.

Figure 8:
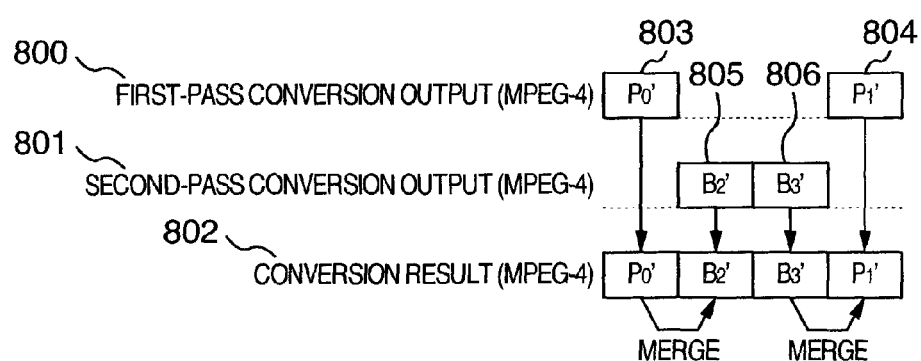
FIG. 8 is a diagram showing merging of a picture output converted in the first-pass conversion of the dual-pass conversion mode with a picture output converted in the second-pass of the dual-pass conversion mode.

FIG. 8 is a diagram showing merging of the picture output in the first-pass conversion with the picture output in the second-pass conversion of the dual-pass conversion mode 201.

Assume now that the original MPEG-2 video pictures are configured so that a P0 picture, a B2 picture, a B3 picture and a P1 picture are arranged sequentially, and that a P0' picture (803) and a P1' picture (804) as MPEG-4 video are output in the first-pass conversion and a B2' picture (805) and B3' picture (806) as MPEG-4 video are output in the second-pass conversion. In this case, the B2' picture (805) and the B3' picture (806) are inserted in between the P0' picture (803) and the P1' picture (804) by the merge control section 105, so that the resulting bit stream is finally output as an MPEG-4 video picture output.

The positions of the B pictures to be inserted in the MPEG-4 video in the first-pass conversion are specified by referring to the insertion picture pointer (604) of the conversion profile 112.

Figure 9A:
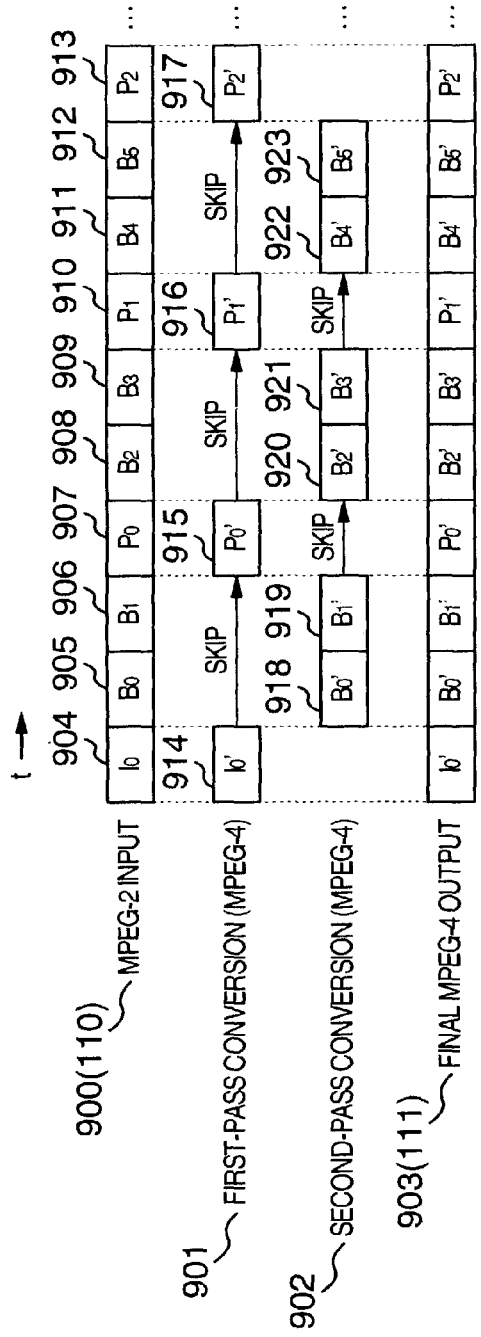
FIGS. 9A and 9B are diagrams showing examples of a flow of pictures as a whole in a conversion operation in a dual-pass conversion mode.
Figure 9B:
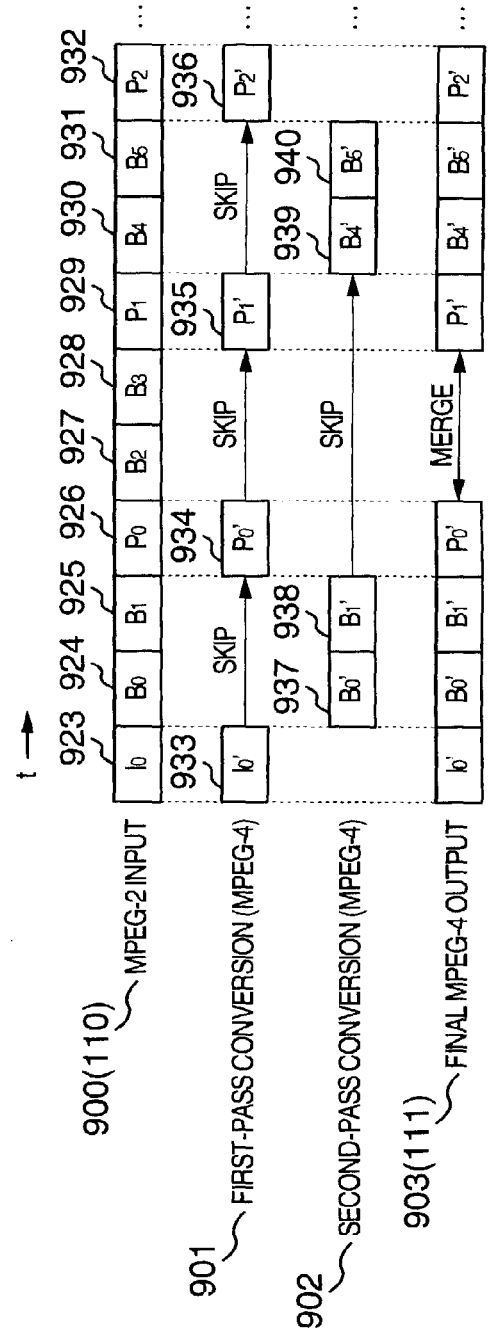

FIGS. 9A and 9B are diagrams showing examples of a total flow of pictures in the converting operation of the video converter 100 in the dual-pass conversion mode 201.

FIG. 9A shows the case where the priority in the second-pass conversion is set to be the highest. When the priority in the second-pass conversion is set to be the highest, all B pictures skipped in the first-pass conversion are converted in the second-pass conversion. When, for example, I0, B0, B1, P0, B2, B3, P1, B4, B5 and P2 pictures (904 to 913) as an MPEG-2 video picture input (900) are input in the cited order as shown in FIG. 9A, a bit stream obtained by connection of I0', P0', P1' and P2' pictures (914 to 917) is output as an MPEG-4 video picture output in the first-pass conversion (901). Subsequently, B0', B1', B2', B3', B4' and B5' pictures (918 to 923) converted are obtained in the second-pass conversion (902) and respectively inserted in predetermined positions of the MPEG-4 video output which has been already obtained in the first-pass conversion. In this case, I0', B0', B1', P0', B2', B3', P1', B4', B5' and P2' pictures are finally arranged in the cited order as the MPEG-4 video picture output (903).

FIG. 9B shows the case where the priority of B pictures in the second-pass conversion is decided.

Assume now that a B0 picture (924), a B1 picture (925), a B4 picture (930) and a B5 picture (931) among I0, B0, B1, P0, B2, B3, P1, B4, B5 and P2 pictures (923 to 932) of the MPEG-2 video picture input (900) are decided to be preferentially converted in the second-pass conversion (902) as shown in FIG. 9B. In this case, conversion of the B2 picture and the P3 picture is skipped both in the first-pass conversion (901) and in the second-pass conversion (902), so that I0', B0', B1', P0', P1', B4', B5' and P2' pictures are finally arranged in the cited order as the MPEG-4 video picture output (903).

FIG. 10 is a diagram showing the contents of the conversion list 113.

The conversion list 113 has basic information 1000, and information about input file address 1001, output file address 1002, conversion mode 1003 and priority 1004. Any conversion list management ID (1005) used for managing the conversion list 113, the number n of files to be converted (1006) and conversion limit time Ltime (1007) are recorded in the basis information 1000. A number n of addresses (1008 to 1010) for indicating the recording medium positions of MPEG-2 video files to be converted are recorded in the input file address 1001. A number n of addresses (1011 to 1013) for indicating the output positions of MPEG-4 video files after conversion are recorded in the output file address 1002. A number n of conversion modes (1014 to 1016) set by the user for the MPEG-2 video input files respectively are recorded in the conversion mode 1003. A number n of priorities (1017 to 1020) set by the user for the MPEG-2 video input files respectively or automatically set on the basis of the creation dates of the MPEG-2 video input files to be converted are recorded in the priority 1004. Incidentally, when the conversion mode 1003 is mode 1, the value of priority is fixed to be 0. When the conversion mode 1003 is mode 3, the value of priority is fixed to be 10. One and the same identifier (File_ID) is given to corresponding parameters in the input file address 1001, the output file address 1002, the conversion mode 1003 and the priority 1004, so that related parameters can be distinguished from unrelated parameters by the identifier.

FIG. 11 is a diagram showing the contents of the conversion schedule 114.

The conversion schedule 114 is information generated on the basis of the conversion list 113. The conversion schedule 114 has basic information 1100, and information about conversion schedule 1101, pass control code 1102, and B picture conversion number 1103 in second-pass conversion. Any conversion schedule management ID (1104) used for managing the conversion schedule 114, a conversion list management ID (1105) of the conversion list 113 to be referred and the number m of conversion steps (1106) to be executed are recorded in the basic information 1100. A number m of IDs (1107 to 1109) shown in the conversion list 113 in order of conversion are recorded in the conversion schedule 1101. A number m of codes (1110 to 1112) indicating converting operations in order of conversion are recorded in the pass control code 1102. In the pass control code 1102, the full conversion mode, the single-pass conversion mode, the first-pass conversion of the dual-pass conversion mode and the second-pass conversion of the dual-pass conversion mode are distinguished from one another. The number of B pictures to be converted in the second-pass conversion of the dual-pass conversion mode among B pictures skipped in the first-pass conversion of the dual-pass conversion mode is recorded in the B picture conversion number 1103 in second-pass conversion. The number recorded in the B picture conversion number 1103 in second-pass conversion is equal to the number of times of conversion executed in the second-pass conversion of the dual-pass conversion mode.

FIG. 12 is a diagram showing the contents of the pass control code 1200.

As shown in FIG. 11, the pass control code 1102 is used for distinguishing the full conversion mode, the single-pass conversion mode, the first-pass conversion of the dual-pass conversion mode and the second-pass conversion of the dual-pass conversion mode from one another. FULL_CNV is set in the full conversion mode. SINGLE_PASS is set in the single-pass conversion mode. DUAL_PASS1 is set in the first-pass conversion of the dual-pass conversion mode. DUAL_PASS2 is set in the second-pass conversion of the dual-pass conversion mode.

Figure 13:
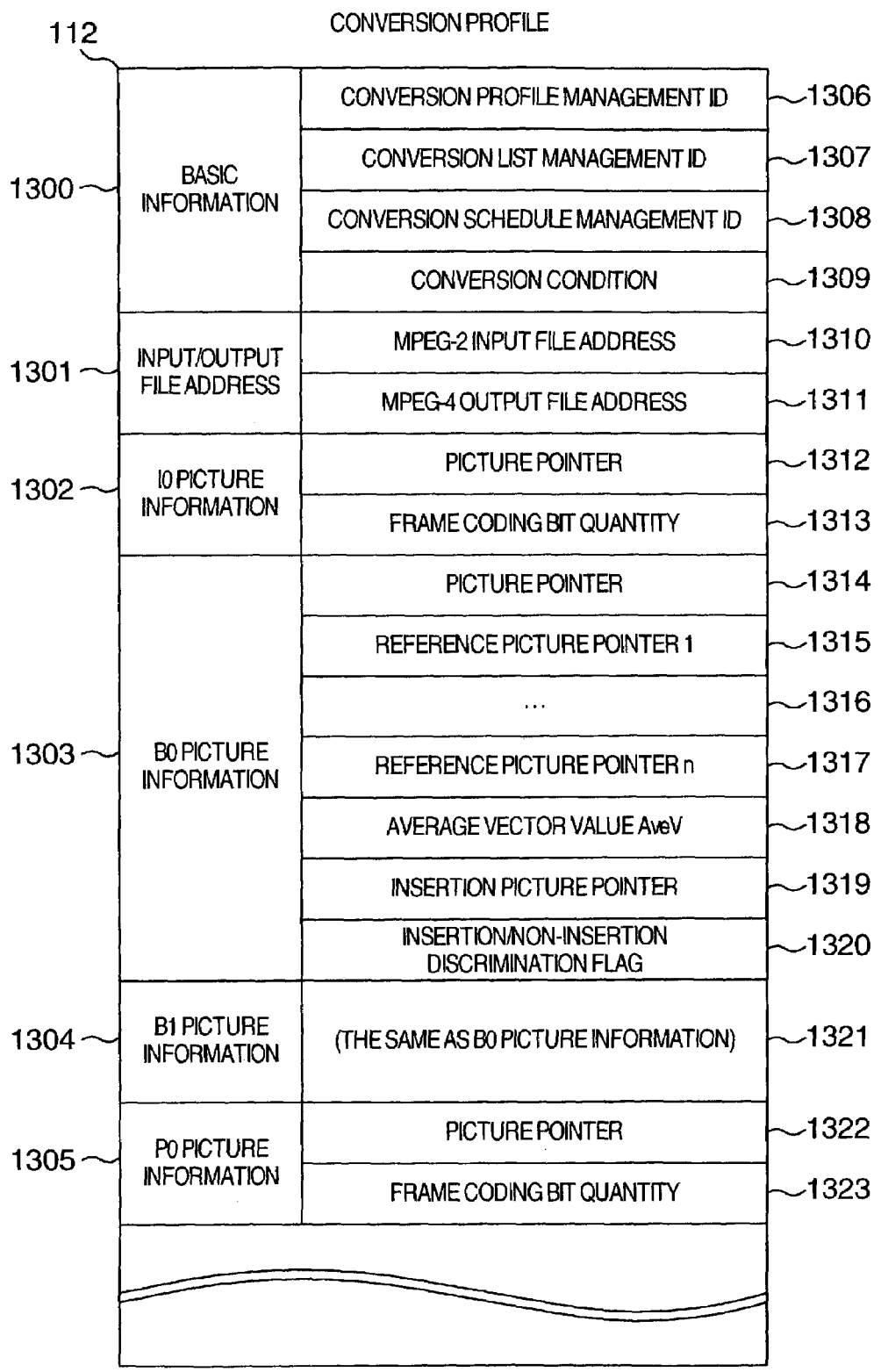
FIG. 13 is a diagram showing the contents of a conversion profile.

FIG. 13 is a diagram showing the contents of the conversion profile 112.

The conversion profile 112 is generated in accordance with every file to be converted.

The conversion profile 112 has basic information 1300, input/output file address 1301, and conversion information (1302 to 1305) of pictures to be converted. Any conversion profile management ID (1306) used for managing the conversion profile 112, a conversion list management ID (1307) of the conversion list 113 to be referred, a conversion schedule management ID (1308) to be referred and a conversion condition 1309 (bit rate, image size, etc.) are recorded in the basic information 1300. An MPEG-2 video input file address 1310 and an MPEG-4 video output file address 1311 obtained by referring to the conversion list 113 are recorded in the input/output file address 1301. Information output from the motion vector check section described above with reference to FIGS. 5 and 6 is recorded in the picture conversion information (1302 to 1305). When, for example, I0, B0, B1 and P0 pictures of MPEG-2 video are input in the cited order by conversion in the single-pass conversion mode, information is recorded as follows. A picture pointer 1312 and a frame coding bit quantity 1313 are recorded in I0 picture conversion information 1302. A picture pointer 1314, at least one reference picture pointer (1315 to 1317), an average vector value AveV (1318), an insertion picture pointer 1319 and an insertion/non-insertion discrimination flag 1320 are recorded in B0 picture conversion information 1303. The same information as that in the B0 picture conversion information 1303 is also recorded in B5 picture conversion information 1304. A picture pointer 1322 and a frame coding bit quantity 1323 are recorded in P0 picture conversion information 1305, like the I0 picture conversion information 1302. Particularly the B0 picture conversion information 1303 and the B1 picture conversion information 1304 are used as reference parameters in the second-pass conversion of the dual-pass conversion mode for specifying the positions of B pictures skipped in the first-pass conversion.

FIG. 14 is a diagram showing an example (113-2) of the contents of the conversion list 113.

As shown in the example of FIG. 14, the conversion list ID (1400) is CNV_LIST_001, the number of files 1401 to be converted is 4, and the limit time 1402 of the whole conversion registered in the list is 600 seconds. Parameters in the input file address 1001, the output file address 1002 and the conversion mode 1003 are indicated in association with one another by IDs. For example, the file address 1403 of File_ID1 indicating a first MPEG-2 video input file is "C:¥movie1.mp2", the file address 1407 of an MPEG-4 video output file corresponding to FILE_ID1 is "C:¥movie1.mp4", the conversion mode 1411 corresponding to FILE_ID1 is mode 2, and the priority 1415 corresponding to FILE_ID1 is 2. The same rule applies to File_ID2, File_ID3 and File_ID4 hereinafter.

FIG. 15 is a diagram showing an example (114-2) of the contents of the conversion schedule 114.

As shown in the example of FIG. 15, the conversion schedule ID 1500 is CNV_SCDL_001, the reference conversion list ID 1501 is CNV_LIST_001, and the number of conversion steps 1502 is 6. Parameters in the conversion schedule 1102 and the pass control code 1103 are indicated in association with each other by every step. For example, the ID of conversion to be executed in the first step (step 1) is File_ID3 (1503), and the pass control code 1103 corresponding to this step is FULL_CNV (1509). This rule applies to the other steps from the second step (step 2) to the sixth step (step 6). The B picture conversion number 1104 in second-pass conversion is set only in the case where the pass control code 1103 is DUAL_PASS2, that is, the second-pass conversion of the dual-pass conversion mode. In the example of FIG. 15, the number of B pictures to be converted in the fifth step is 400 (frames), and the number of B pictures to be converted in the sixth step is 500 (frames).

Figure 16:
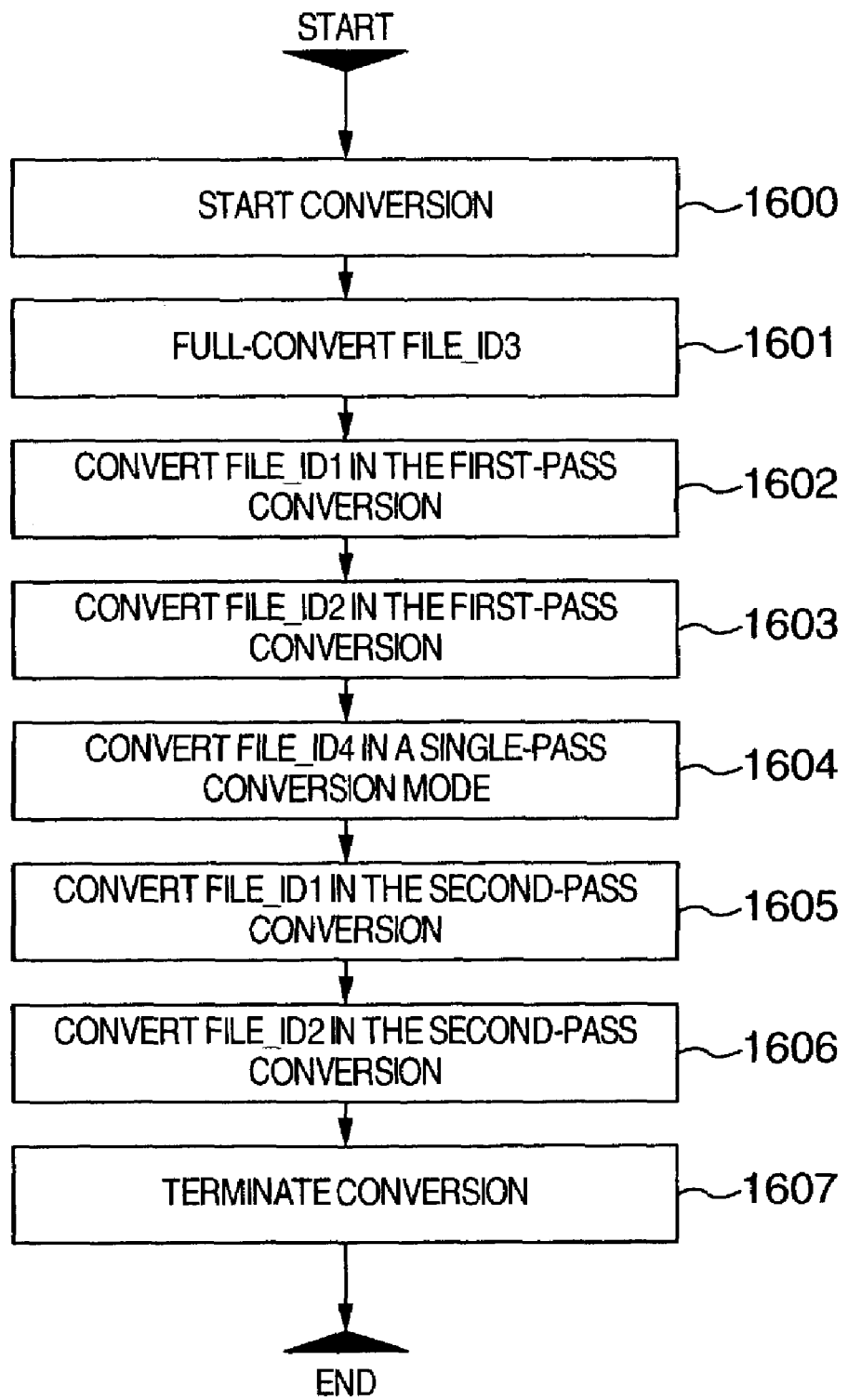
FIG. 16 is a flow chart showing an example of the sequence of execution of conversion based on the conversion schedule.

FIG. 16 is a flow chart showing an example of the conversion sequence based on the conversion schedule 114-2.

Referring to FIG. 16, the flow chart of conversion steps will be described by using the contents of the conversion schedule 114-2 shown in FIG. 15 as an example. The operation based on the conversion schedule is as follows. When conversion starts (1600), full conversion of File_ID3 is executed in the first step (1601). First-pass conversion of File_ID1 in the dual-pass conversion mode is executed in the second step (1602). First-pass conversion of File_ID2 in the dual-pass conversion mode is executed in the third step (1603). Single-pass conversion of File_ID4 is executed in the fourth step (1604). Successively, second-pass conversion of File_ID1 in the dual-pass conversion mode is executed in the fifth step (1605). Second-pass conversion of File_ID2 in the dual-pass conversion mode is executed in the sixth step (1606). Then, conversion is terminated (1607).

Figure 17A:
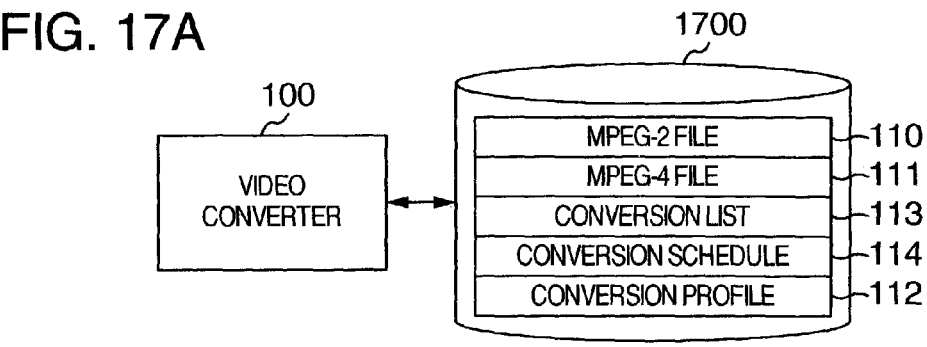
FIGS. 17A and 17B are diagrams showing the connection relation of the video converter to input/output video files and information files referred to at the time of execution of conversion.
Figure 17B:
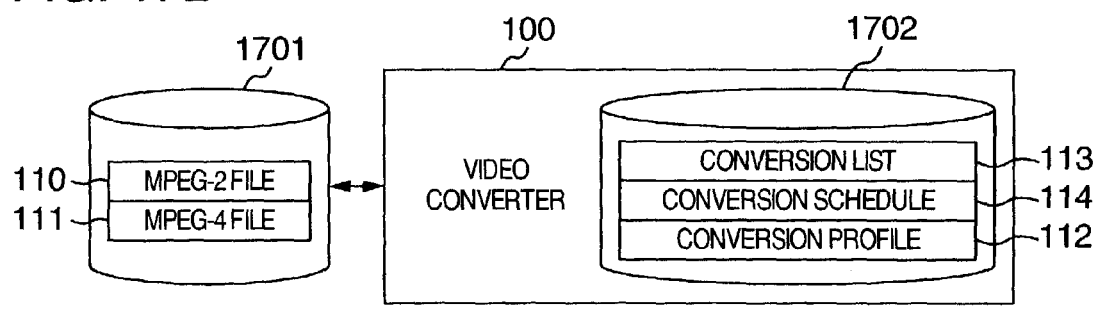

FIGS. 17A and 17B are diagrams showing the relation in connection between the video converter 100 and input/output video files and information files to be referred to at the time of execution of conversion.

FIG. 17A is a diagram showing an example of the relation in connection.

In FIG. 17A, the video converter 100 is connected to a recording medium 1700 provided separately. An MPEG-2 video file 110, an MPEG-4 video file 111, a conversion list 113, a conversion schedule 114 and a conversion profile 112 are stored in the recording medium 1700. Any medium may be used as the recording medium 1700 if these files, list, schedule and profile can be stored in the medium. For example, an HDD, a DVD-RAM, a DRAM, a flash memory or the like may be used as the recording medium 1700. A plurality of recording media 1700 may be provided so that the video converter 100 can be connected to the plurality of recording media 1700.

This configuration has an advantage that conversion history can be managed easily because the MPEG-2 video file 110, the MPEG-4 video file 111, the conversion list 113, the conversion schedule 114 and the conversion profile 112 are recorded in one external recording medium 1700 group. This configuration further has an advantage that the same conversion history as that of the original video converter 100 can be inherited when the recording medium is connected to another video converter.

FIG. 17B is a diagram showing another example of the relation in connection.

In FIG. 17B, an MPEG-2 video file 110 and an MPEG-4 video file 111 which are relatively large in file capacity are stored in a large-capacity recording medium 1701 externally connected to the video converter 100 while a conversion list 113, a conversion schedule 114, a conversion profile 112, etc. which are relatively small in file capacity are stored in a recording medium 1702 contained in the video converter 100.

This configuration is formed so that the conversion list 113, the conversion schedule 114 and the conversion profile 112 are stored only in the inside of the video converter 100. Conversion history cannot be inherited even in the case where the recording medium 1701 having the MPEG-2 video file 110 and the MPEG-4 video file 111 stored therein is connected to another video converter. That is, this configuration has an advantage that the information of conversion history can be concealed when conversion history must be prevented from becoming known to the outside.

Figure 18:
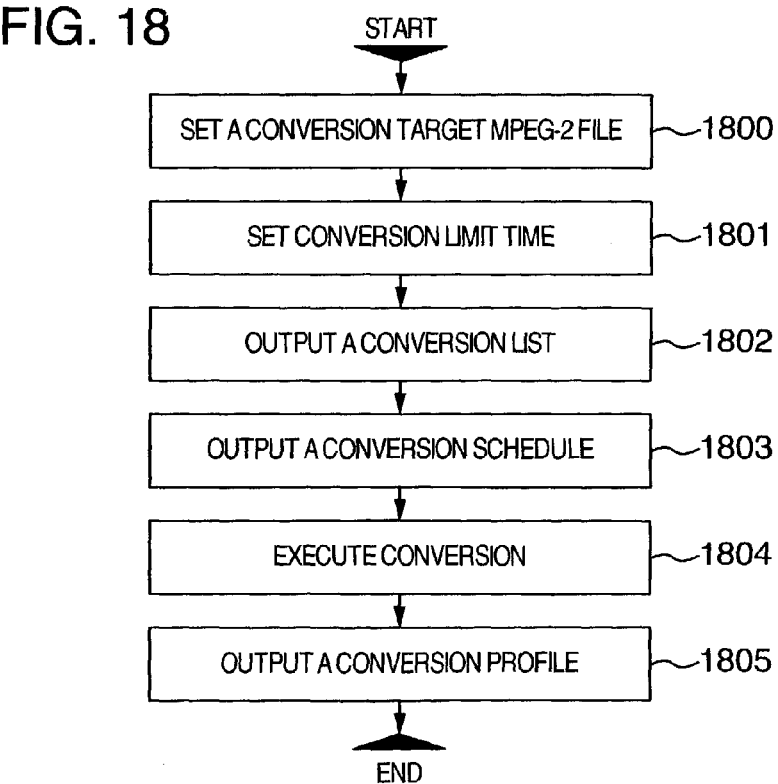
FIG. 18 is a flow chart showing a flow of video converting operations as a whole.

FIG. 18 is a flow chart showing a total flow of video converting operation.

In video conversion, first, an MPEG-2 video file to be converted is set by a user operation (1800). A limit time for the whole conversion operation is set (1801). Then, a conversion list 113 and a conversion schedule 114 are automatically output (1802 and 1803) on the basis of the contents of the user setting. Video conversion is executed (1804) on the basis of the contents of the conversion list 113 and the conversion schedule 114. A conversion profile 112 is automatically output (1805) during execution of video conversion.

Figure 19:
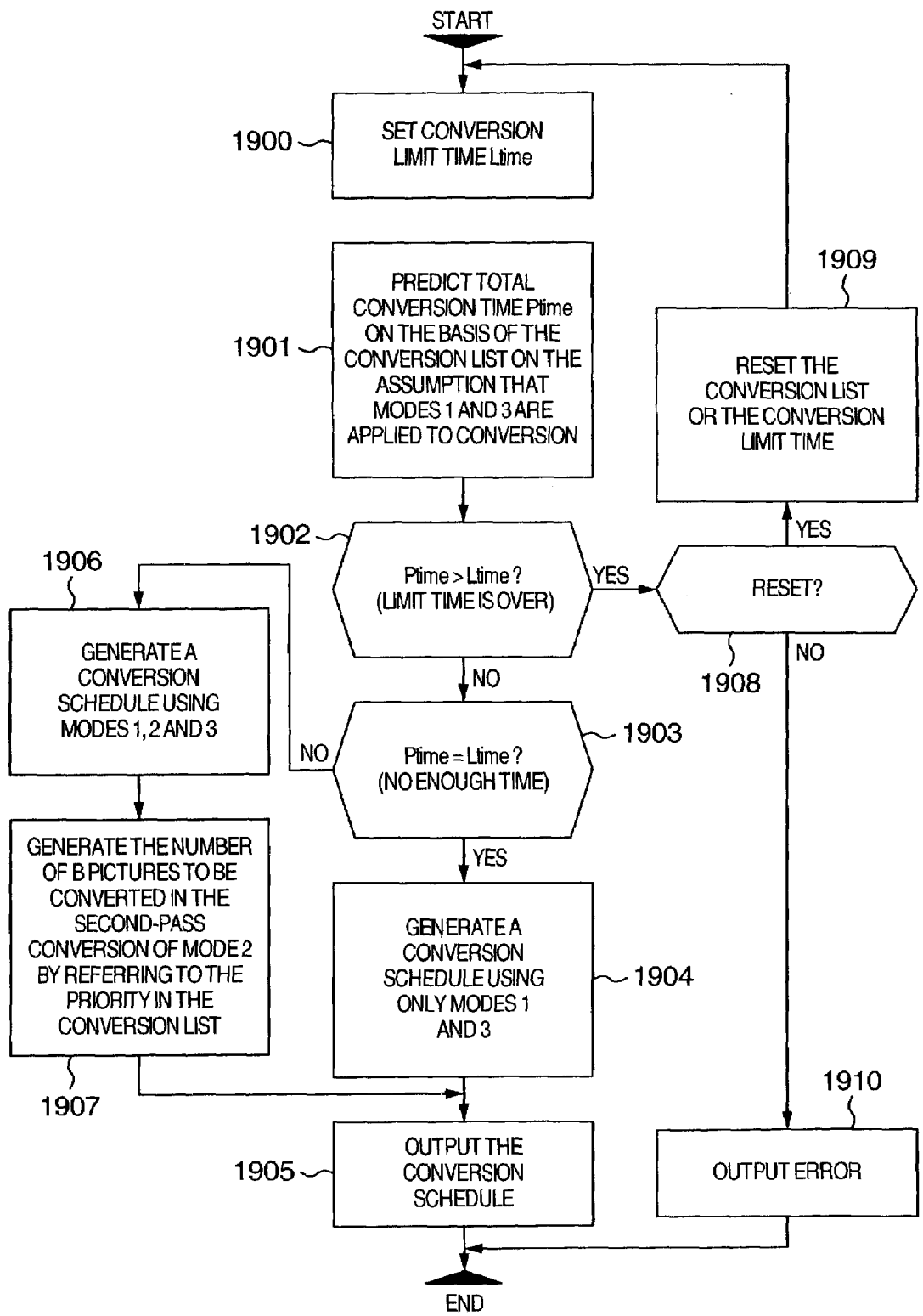
FIG. 19 is a flow chart showing a process for deciding a conversion schedule on the basis of the set conversion limit time.

FIG. 19 is a flow chart showing a process of deciding a conversion schedule 114 on the basis of a set conversion limit time.

In the process of deciding a conversion schedule 114, first, a conversion limit time (hereinafter referred to as "Ltime") is read by referring to the conversion list 113 (1900). Prediction of a total conversion time (hereinafter referred to as "Ptime") is carried out on the assumption that the conversion mode set in the conversion list is limited to mode 1 and mode 3 (1901). That is, Ptime is predicted on the assumption that conversion in mode 2 (dual-pass conversion mode) is temporarily replaced by conversion in mode 1 (single-pass conversion mode). The predicted conversion time Ptime is calculated by referring to the bit rate, frame rate, frame coding bit quantity, etc. of input/output video. Here, Ltime is compared with Ptime. When Ptime is longer than Ltime (1902), the user is urged to set the setting contents again (1908) because there is possibility that all conversion steps are not completed within the conversion limit time. When the setting contents need to be set again, the conversion list or the conversion limit time is set again (1909) and the situation of the process goes back to the step 1900. When the setting contents need not be set again, a message indicating error is output to the monitor 109 (1910) and the process is terminated. When Ptime is not longer than Ltime, a judgment is made as to whether Ptime is equal to Ltime or not (1903). When Ptime is equal to Ltime, a conversion schedule 114 with contents using mode 1 and mode 3 as the conversion mode, that is, provided in such a manner that conversion in mode 2 (dual-pass conversion mode) is replaced by conversion in mode 1 (single-pass conversion mode) is generated (1904) because it is conceived that there is no enough time to execute the second-pass conversion of the dual-pass conversion mode. When Ptime is shorter than Ltime, a conversion schedule 114 using mode 1, mode 2 and mode 3 is generated in accordance with the contents set by the user (1906) because it is conceived that there is enough time to execute the second-pass conversion in the dual-pass conversion mode. Then, B picture conversion number used in second-pass conversion of mode 2 is generated by referring to the priority in the conversion list (1907) so that the B picture conversion number is reflected in the conversion schedule 114. A value set in advance may be used as the priority or a value input by the user may be used as the priority as occasion demands. As the B picture conversion number, the number of B pictures allowed to be converted is calculated on the basis of time (Ltime–Ptime) obtained by subtracting the predicted conversion time from the conversion limit time and is distributed to the step of executing the second-pass conversion. The conversion schedule 114 generated in the aforementioned procedure is output as a file to the recording medium (1905).

Figure 20:
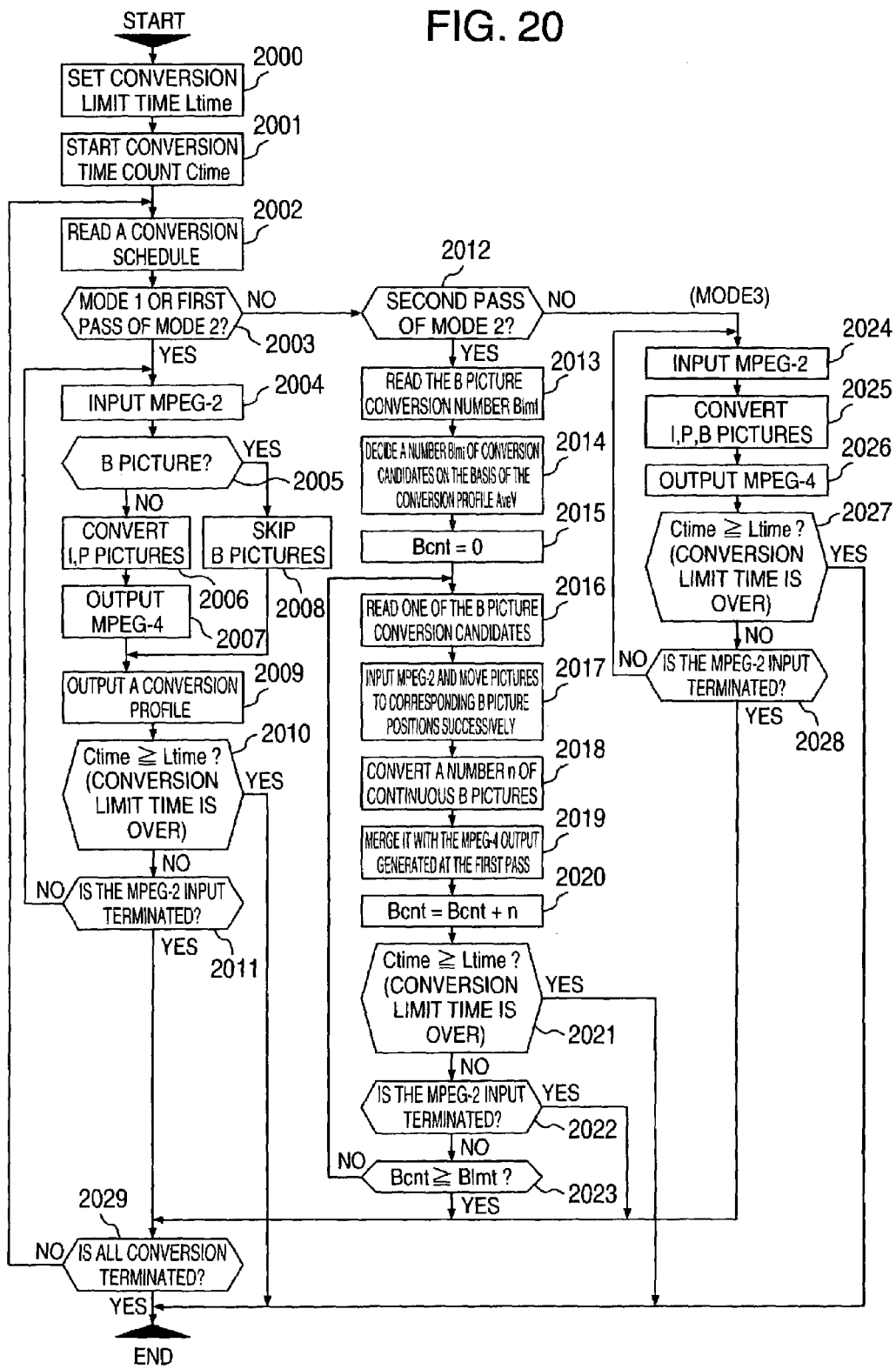
FIG. 20 is a flow chart showing a flow of video converting operations.

FIG. 20 is a flow chart showing a flow of video converting operations.

First, the conversion limit time (hereinafter referred to as "Ltime") is read (2000) and counting of conversion time (hereinafter referred to as "Ctime") by the timer is started (2001). Then, the conversion schedule 114 is read (2002) and the process branches in accordance with the conversion mode in each conversion step.

When the conversion mode is mode 1 or first-pass conversion of mode 2, the processing steps 2004 to 2011 are executed. Pictures are successively read from an MPEG-2 video file (2004). The kind of each input picture is judged (2005). When the picture is an I picture or a P picture, conversion is performed immediately (2006) so that an MPEG-4 video file is output (2007) and a conversion profile is further output (2009). When the picture is a B picture, conversion is skipped (2008) so that only a conversion profile is output (2009). At this point of time, a judgment is made as to whether Ctime is longer than Ltime or not (conversion limit time is over or not) (2010). When conversion limit time is over, video conversion is terminated immediately. When conversion limit time is not over, a judgment is made as to whether input of the MPEG-2 video file is completed or not (2011). When input of the MPEG-2 video file is not completed, the situation of the process goes back to the processing step 2004. When input of the MPEG-2 video file is completed, a judgment is made as to whether all conversion steps registered in the conversion schedule 114 are completed or not (2029). When all conversion steps are not completed, the situation of the process goes back to the processing step 2002. When all conversion steps are completed, the video converting operation is terminated.

When the conversion mode is the second-pass conversion of mode 2, processing steps 2013 to 2023 are executed. First, B picture conversion number (hereinafter referred to as "Blmt") in second-pass conversion is read from the conversion schedule 114 (2013). A number Blmt of conversion candidates among the B pictures are decided in descending order of the magnitude of AveV of B picture by referring to the average vector value AveV of the conversion profile 112 (2014). As another method, B picture conversion candidates may be decided on the basis of the frame coding bit quantity just before every skipped B picture as shown in FIGS. 7A to 7C. Then, a converted B picture counter (hereinafter referred to as "Bcnt") is initialized to zero (2015) and one of the B picture conversion candidates is read (2016). Then, pictures are successively read from the MPEG-2 video file and the pointer is moved to the position of the B picture conversion candidate (2017). A number n of continuous B pictures including the B picture conversion candidate are converted (2018). The positions of I or P pictures referred to for conversion of the B pictures are specified by the reference picture pointer 603 of the conversion profile 112. After conversion, the converted B pictures are merged with a predetermined position of the MPEG-4 video file which has been already generated by the first-pass conversion (2019). The merge position is specified by the insertion picture pointer 604 of the conversion profile 112. Then, n is added to Bcnt (2020). At this point of time, a judgment is made as to whether Ctime is longer than Ltime or not (conversion limit time is over or not) (2021). When conversion limit time is over, video conversion is terminated immediately. When conversion limit time is not over, a judgment is made as to whether input of the MPEG-2 video file is completed or not (2022) and a judgment is made as to whether Bcnt is larger than Blmt or not (2023). When input of the MPEG-2 video file is not completed and Bcnt is not larger than Blmt, the situation of the process goes back to the processing step 2016. When input of the MPEG-2 video file is completed or Bcnt is larger than Blmt, a judgment is made as to whether all conversion steps registered in the conversion schedule 114 are completed or not (2029). When all conversion steps are not completed, the situation of the process goes back to the step 2002. When all conversion steps are completed, the video converting operation is terminated.

When the conversion mode is mode 3, processing steps 2024 to 2028 are executed. Pictures are successively read from an MPEG-2 video file (2024). All input I, P and B pictures are converted immediately (2025), so that an MPEG-4 video file is output (2026). Then, a judgment is made as to whether Ctime is longer than Ltime or not (conversion limit time is over or not) (2027). When conversion limit time is over, video conversion is terminated immediately. When conversion limit time is not over, a judgment is made as to whether input of the MPEG-2 video file is completed or not (2028). When input of the MPEG-2 video file is not completed, the situation of the process goes back to the processing step 2024. When input of the MPEG-2 video file is completed, a judgment is made as to whether all conversion steps registered in the conversion schedule 114 are completed or not (2029). When all conversion steps are not completed, the situation of the process goes back to the processing step 2002. When all conversion steps are completed, the video converting operation is terminated.

Although this example has been described on the case where the conversion profile is output in mode 1 or in the first-pass conversion of mode 2, the invention may be also applied to the case where the conversion profile is output in mode 3 and in the second-pass conversion of mode 2.

Figure 21:
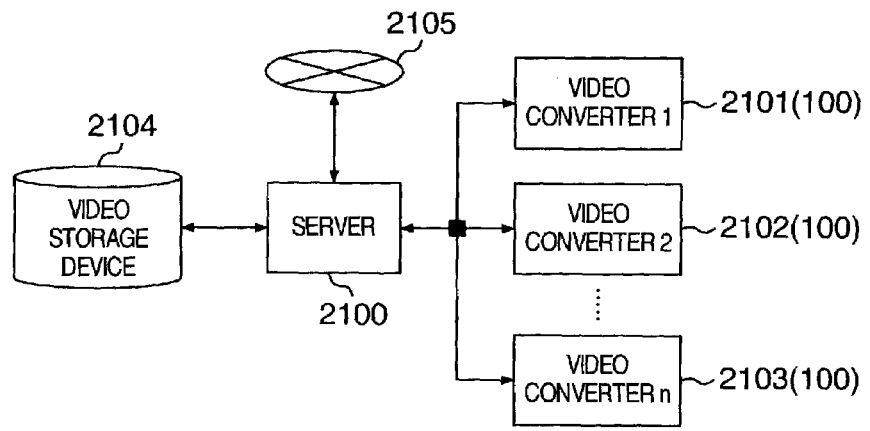
FIG. 21 is a diagram showing an example of the operational system using the video converter.

FIG. 21 is a diagram showing an example of operating form using video converters 100.

FIG. 21 shows a configuration example in which a plurality of video converters 100 (2101 to 2103) and a video storage device 2104 for recording MPEG-2 video and MPEG-4 video are connected to a video delivery server 2100 connected to an external public network 2105 such as the Internet or a wireless system. The video delivery server 2100 allocates conversion schedules to the video converters (2101 to 2103) suitably in accordance with the conversion time and conversion capacity of each video converter. Both MPEG-2 video before conversion and MPEG-4 video after conversion are transmitted/received between each of the video converters (2101 to 2103) and the video storage device 2104 through the video delivery server 2100.

Figure 22:
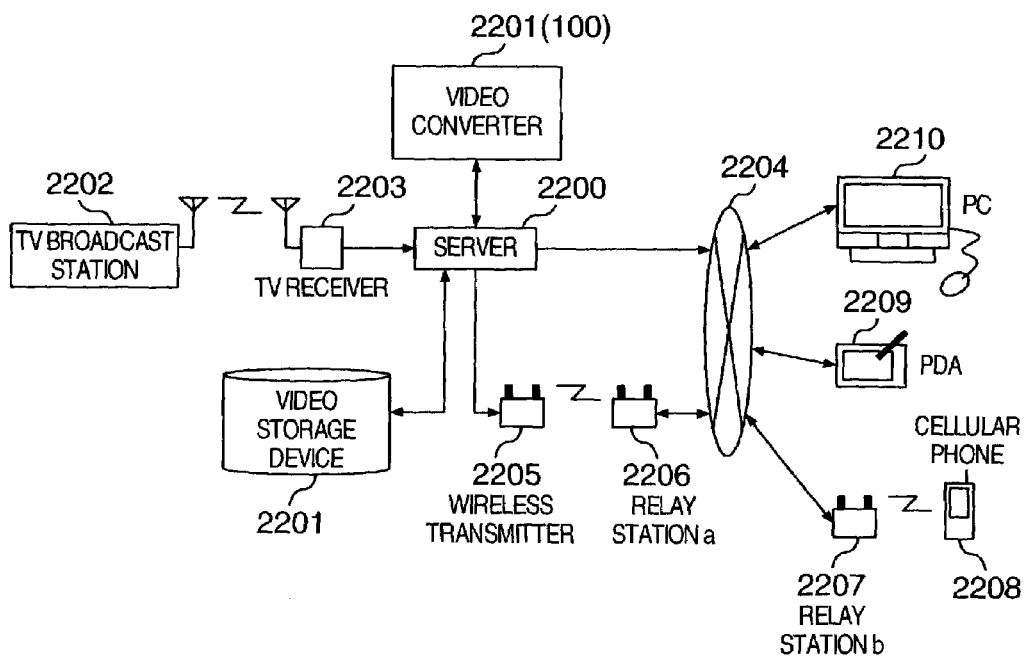
FIG. 22 is a diagram showing another example of the operational system using the video converter.

FIG. 22 is a diagram showing another example of operating form using the video converter 100.

FIG. 22 shows a configuration example in which a video converter 2201, a TV receiver 2203 for receiving a BS digital broadcast program or the like broadcast from a TV station 2202, a video storage device 2211 for recording the received TV program and MPEG-4 video after conversion by the video converter 2201, an external public network 2204 such as the Internet and a wireless transmitter 2205 for transmitting a signal to a cellular phone 2208 or the like are connected to a video delivery server 2200. In this example, a plurality of TV programs received can be stored in the video storage device 2211, so that the plurality of TV programs can be collectively converted into MPEG-4 video by the video converter 2201. The MPEG-4 video after conversion can be delivered by the video delivery server 2200 via the external public network 2204 such as the Internet, so that the MPEG-4 video can be enjoyed at an audience terminal such as a PC (Personal Computer) 2210 or a PDA 2209. The MPEG-4 video after conversion can be also delivered by the video delivery server 2200 via the wireless transmitter 2205 and wireless relay stations 2206 and 2207, so that the MPEG-4 video can be enjoyed at a terminal such as a cellular phone, a PHS (Personal Handyphone System), a car telephone or a terminal connected to a wireless LAN. As a further embodiment, a PDA or a cellular phone may be directly connected to the video converter 100 so that video after conversion can be played back. A data recording device for writing video after conversion on a recording medium such as a flash memory may be further connected to the video converter 100 so that the video after conversion can be played back in the condition that the recording medium having the stored video generated by using the data recording device is mounted in a PDA or a cellular phone.

Any format of input/output video files can be applied to the video converter according to the invention if a video coding method using not only MPEG-2 and MPEG-4 but also a kind of pictures obtained by predictive coding and not referred to by other pictures is used. For example, MPEG1 (Moving Picture Experts Group Phase 1) which is a video coding method for storage media such as a video CD, H.263 which is a video coding method for TV telephone, DV-codec (Digital Video-codec) and D-VHS (Digital-Video Home System) which are video coding methods for digital VTR (Video Tape Recorder) or the like may be used.

In the computer program according to the invention, three kinds of conversion modes different in processing procedure can be allocated in accordance with the priority of video conversion set by the user so that all conversion processes can be completed within a set limit time while video quality is kept at a predetermined level even in the case where there is given a conversion request such that conversion cannot be completed within the set limit time if the conversion is made in a conversion mode for converting all pictures.

When particularly high video quality is not required of video after conversion, the processing load on the CPU of a computer provided with the program according to the invention can be minimized because a conversion mode low in processing load can be selected in accordance with the contents of conversion. If MPEG-4 video generated only by the first conversion stage in which conversion of B pictures is skipped is used, the video can be delivered to a wireless communication circuit such as a PHS or a cellular phone which is smaller in transmission capacity than a wire communication circuit. In the case where the same MPEG-2 video needs to be fully converted for another communication circuit large in transmission capacity, it is unnecessary to start all conversion from the beginning but the second-pass conversion of B picture portions skipped in the first-pass conversion may be executed by using the MPEG-4 video and the conversion profile after the first-pass conversion. In this manner, the invention can provide an appropriate conversion method in accordance with the condition of the bandwidth of a transmission line.

When MPEG-2 video large in coding bit quantity is converted into MPEG-4 video small in coding bit quantity by the method according to the invention, the MPEG-4 video can be delivered to an external public network which is so small in transmission capacity that the MPEG-2 video cannot be delivered.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A re-encoding method in which data constituted by various kinds of pictures encoded by a first encoding method is re-encoded by a second encoding method, said re-encoding method including the steps of:
    acquiring encoded data constituted by said various kinds of pictures;
    receiving conversion time from input means;
    selecting one of a plurality of re-encoding modes in accordance with the conversion time;
    re-encoding said encoded data in the selected mode; and
    storing said re-encoded data in storage means,
    wherein said plurality of re-encoding modes includes a first mode, a second mode, and a third mode,
    wherein said first mode extracts/decodes a predetermined kind of pictures from said various kinds of pictures and applies said second encoding method to said predetermined kind of pictures,
    wherein said second mode applies said second encoding method to pictures other than said extracted predetermined kind of pictures after said predetermined kind of pictures are encoded, and
    wherein said third mode applies said second encoding method to said acquired encoded data in acquiring order.

2. A re-encoding method according to claim 1, wherein:
    said acquiring step further includes acquiring a plurality of pieces of encoded data;
    said re-encoding method further includes setting priority of each of said plurality of pieces of encoded data; and
    said mode selection step further includes selecting a mode in accordance with said priority of each of said plurality of pieces of encoded data.

3. A re-encoding method according to claim 2, wherein said mode selection step further includes selecting a mode based on comparison between said input conversion time as limit time and conversion time calculated on an assumption that said acquired encoded data is applied to each of said three modes.

4. A re-encoding method according to claim 3, wherein:
    said first mode discriminates the kind of said acquired data, skips pictures other than said predetermined kind of pictures and records information of the skipping as profile information in a storage unit; and
    said second mode performs said second encoding method based on said profile information read.

5. A re-encoding method according to claim 2, wherein:
    said first mode discriminates the kind of said acquired data, skips pictures other than said predetermined kind of pictures, and records information of the skipping as profile information in a storage unit; and
    said second mode performs said second encoding method based on said profile information read.

6. A re-encoding method according to claim 5, wherein said profile information includes:
    information concerning a condition for said conversion;
    information concerning a source where said encoded data is acquired and a destination where said encoded data after conversion is output; and
    information concerning a pointer of a picture referred to at the time of applying said second encoding method to pictures other than said predetermined kind of pictures and a position where said pictures encoded by said second encoding method are inserted.

7. A re-encoding method according to claim 1, wherein said mode selection step further includes selecting a mode based on a comparison between said input conversion time as limit time and conversion time calculated on an assumption that said acquired encoded data is applied to each of said three modes.

8. A re-encoding method according to claim 7, wherein:
    said first mode discriminates the kind of said acquired data, skips pictures other than said predetermined kind of pictures, and records information of the skipping as profile information in a storage unit; and
    said second mode performs said second encoding method based on said profile information read.

9. A re-encoding method according to claim 8, wherein said profile information includes:

information concerning a condition for said conversion;

information concerning a source where said encoded data is acquired and a destination where said encoded data after conversion is output; and information concerning a pointer of a picture referred to at the time of applying said second encoding method to pictures other than said predetermined kind of pictures and a position where said pictures encoded by said second encoding method are inserted.

10. A re-encoding method according to claim 1, wherein:

said first mode discriminates the kind of said acquired data, skips pictures other than said predetermined kind of pictures, and records information of the skipping as profile information in a storage unit; and said second mode performs said second encoding method based on said profile information read.

11. A re-encoding method according to claim 10, wherein said profile information includes:

information concerning a condition for said conversion;

information concerning a source where said encoded data is acquired and a destination where said encoded data after conversion is output; and information concerning a pointer of a picture referred to at the time of applying said second encoding method to pictures other than said predetermined kind of pictures and a position where said pictures encoded by said second encoding method are inserted.

12. A re-encoding system for re-encoding data constituted by various kinds of pictures by a second encoding method, comprising:

a unit for acquiring encoded data constituted by various kinds of pictures encoded by a first encoding method;

input unit for receiving input of conversion time of said encoded data;

a unit for selecting one of a plurality of re-encoding modes in accordance with said conversion time;

a unit for re-encoding said encoded data in said selected mode; and a unit for outputting said re-encoded data, wherein said plurality of re-encoding modes includes a first mode, a second mode, and a third mode, wherein said a first mode extracts/decodes a first kind of pictures from said various kinds of pictures and applies said second encoding method to said first kind of pictures, wherein said a second mode applies said second encoding method to pictures other than said first kind of pictures after said first kind of pictures are re-encoded, wherein said a third mode applies said second encoding method to said acquired encoded data in acquiring order, and wherein said second mode is executed by referring to second picture information generated in said first mode, so that said unit for outputting said re-encoded data also outputs said second picture information.

13. A re-encoding system according to claim 12, further comprising a unit for setting priority of each piece of encoded data when a plurality of pieces of encoded data are acquired through said input unit, wherein said unit for selecting refers to said priority.

* * * * *